US007853005B2

(12) United States Patent
Hahn et al.

(10) Patent No.: US 7,853,005 B2
(45) Date of Patent: *Dec. 14, 2010

(54) WEB-BASED NETWORK MONITORING TOOL

(75) Inventors: Douglas Alan Hahn, Chicago, IL (US); Bruce Lee Leatherman, Lemont, IL (US)

(73) Assignee: AT&T Intellectual Property I, L.P., Reno, NV (US)

( * ) Notice: Subject to any disclaimer, the term of this patent is extended or adjusted under 35 U.S.C. 154(b) by 73 days.

This patent is subject to a terminal disclaimer.

(21) Appl. No.: 11/691,333

(22) Filed: Mar. 26, 2007

(65) Prior Publication Data

US 2007/0286394 A1 Dec. 13, 2007

Related U.S. Application Data

(63) Continuation of application No. 11/122,812, filed on May 5, 2005, now Pat. No. 7,197,131, which is a continuation of application No. 09/532,208, filed on Mar. 22, 2000, now Pat. No. 6,970,552.

(51) Int. Cl.
H04M 3/00 (2006.01)
H04M 3/523 (2006.01)
H04M 15/00 (2006.01)

(52) U.S. Cl. .................. 379/265.03; 379/133; 379/136; 379/137; 379/246; 379/247; 379/265.09

(58) Field of Classification Search .................. 379/133, 379/136, 246, 247, 265.02, 265.09, 137, 379/265.03
See application file for complete search history.

(56) References Cited

U.S. PATENT DOCUMENTS

| 4,510,351 | A | * | 4/1985 | Costello et al. ........ 379/265.01 |
| 5,153,909 | A | | 10/1992 | Beckle et al. |
| 5,285,494 | A | | 2/1994 | Sprecher et al. |
| 5,530,744 | A | | 6/1996 | Charalambous |
| 5,533,116 | A | | 7/1996 | Vesterinen et al. |

(Continued)

OTHER PUBLICATIONS

"Vista: Interactive Communications Software Platform", http://www.syntellect.com/vista.html), 1998.

(Continued)

*Primary Examiner*—Harry S Hong
(74) *Attorney, Agent, or Firm*—Jackson Walker L.L.P.

(57) ABSTRACT

A monitoring tool for use with one or more automatic call distributors (ACD) which automatically and continuously polls or queries the ACDs to monitor not only alarm conditions but other conditions, such as agent staffing levels, call answering time, call routing and traffic conditions. Such continuous and automatic monitoring and querying of the ACD in accordance with the present invention is thus able to improve the overall efficiency of such ACDs by improving the service response time of such ACDs. In accordance with one aspect of the invention, the status records of the ACDs maybe directed to a website, for example, on an enterprise Intranet website to enable any of the company representatives with access rights to access the performance of the ACD network from any location. Other data, such as the trunk inventory record keeping system (TIRKS) may also be displayed on the website to facilitate troubleshooting of alarm conditions. Another aspect of the invention is the ability to provide automatic paging for predetermined alarm status condition.

7 Claims, 20 Drawing Sheets

U.S. PATENT DOCUMENTS

| | | | |
|---|---|---|---|
| 5,546,455 A | 8/1996 | Joyce et al. | |
| 5,555,297 A | 9/1996 | Ochy et al. | |
| 5,590,188 A | 12/1996 | Crockett | |
| 5,734,831 A | 3/1998 | Sanders et al. | |
| 5,742,762 A | 4/1998 | Scholl et al. | |
| 5,768,552 A | 6/1998 | Jacoby | |
| 5,819,028 A | 10/1998 | Manghirmalani et al. | |
| 5,870,558 A | 2/1999 | Branton, Jr. et al. | |
| 5,917,485 A | 6/1999 | Spellman et al. | |
| 6,229,538 B1 | 5/2001 | McIntyre et al. | |
| 6,385,301 B1 * | 5/2002 | Nolting et al. | 379/32.01 |
| 6,490,350 B2 | 12/2002 | McDuff et al. | |
| 6,542,156 B1 | 4/2003 | Hong et al. | |
| 6,628,304 B2 | 9/2003 | Mitchell et al. | |
| 6,633,640 B1 | 10/2003 | Cohen et al. | |
| 6,654,457 B1 * | 11/2003 | Beddus et al. | 379/265.02 |
| 6,970,552 B1 * | 11/2005 | Hahn et al. | 379/265.02 |
| 7,197,131 B2 * | 3/2007 | Hahn et al. | 379/265.02 |

OTHER PUBLICATIONS

"Syntellect Release New Interactive Communications Management Software Platform Based on Open Standards", http://www.syntellect.com/pr051298.html, May 1998.

* cited by examiner

*Fig. 4*

| TRUNK GROUP | TRKS | OOS | %OCC | .....20.....40.....60.....80.....100 |
|---|---|---|---|---|
| TROY | 708 | 0 | 59% | |
| HUDSON | 708 | 0 | 2% | |
| DID | 96 | 0 | 0% | |
| IMT CHICAGO 1 | 214 | 0 | 2% | |
| IMT CHICAGO 2 | 238 | 0 | 23% | |
| IMT CHICAGO 3 | 118 | 0 | 3% | |
| IMT CLEVELAND | 238 | 0 | 1% | |
| IMT DETROIT 2 | 498 | 0 | 26% | |
| OUT DETROIT | 216 | 0 | 32% | |
| OUT SOUTHFIELD | 216 | 0 | 0% | |
| MICH IVR | 288 | 0 | 22% | |
| CQC | | | | |
| EPN'S | | | | |

ALARM STATUS

There are 0 alarms:

CURRENT SYSTEM STATUS

There are 233 agents active, 68 calls in queue at 10:12.
No TDM blockage. Highest past hour (09:00) occupancy was 35% in PN 1.
No PN blockage. Highest past hour (09:00) occupancy was 24% in PN 28.
User 'rbarnh' connected dial-up.
Occupancy St: 5% Sm: 40% Cp: 14% Idl: 41%
SPE: B/auto A/functional
Busied Out Trk: 0 Stn: 0 Oth: 0

*Fig. 5a*

11:ACI TROY

| TGN | OE | CKT ID | ALARM STATUS | CSU_A | CSU_Z | MISC |
|---|---|---|---|---|---|---|
| 011 | 003A19 | HCGS 324230 | NONE | N/A | N/A | TROY TGN 623 |
| | 004A18 | HCGS 324330 | NONE | N/A | N/A | |
| | 002A13 | HCGS 324331 | NONE | N/A | N/A | |
| | 004A11 | HCGS 324332 | NONE | N/A | N/A | |
| | 001A09 | HCGS 324333 | NONE | N/A | N/A | |

150

13:ACI TROY

| TGN | OE | CKT ID | ALARM STATUS | CSU_A | CSU_Z | MISC |
|---|---|---|---|---|---|---|
| 013 | 005E15 | HCGS 324339 | NONE | N/A | N/A | TROY TGN 626 |
| | 006E15 | HCGS 324340 | NONE | N/A | N/A | |
| | 005E11 | HCGS 324341 | NONE | N/A | N/A | |
| | 006E11 | HCGS 324342 | NONE | N/A | N/A | |
| | 007E10 | HCGS 324343 | NONE | N/A | N/A | |

152

15:ACI TROY

| TGN | OE | CKT ID | ALARM STATUS | CSU_A | CSU_Z | MISC |
|---|---|---|---|---|---|---|
| 015 | 003A17 | HCGS 324349 | NONE | N/A | N/A | TROY TGN 627 |
| | 004A17 | HCGS 324350 | NONE | N/A | N/A | |
| | 004A12 | HCGS 324351 | NONE | N/A | N/A | |
| | 005A12 | HCGS 324352 | NONE | N/A | N/A | |
| | 006A12 | HCGS 324353 | NONE | N/A | N/A | |

154

17:ACI TROY

| TGN | OE | CKT ID | ALARM STATUS | CSU_A | CSU_Z | MISC |
|---|---|---|---|---|---|---|
| 017 | 004E17 | HCGS 324483 | NONE | N/A | N/A | TROY TGN 629 |
| | 005E17 | HCGS 324484 | NONE | N/A | N/A | |
| | 006A17 | HCGS 324485 | NONE | N/A | N/A | |
| | 007A17 | HCGS 324486 | NONE | N/A | N/A | |
| | 007E17 | HCGS 324487 | NONE | N/A | N/A | |

156

18:ACI TROY

| TGN | OE | CKT ID | ALARM STATUS | CSU_A | CSU_Z | MISC |
|---|---|---|---|---|---|---|
| 018 | 004E18 | HCGS 324488 | NONE | N/A | N/A | TROY TGN 624 |
| | 005E18 | HCGS 324489 | NONE | N/A | N/A | |
| | 006E18 | HCGS 324490 | NONE | N/A | N/A | |
| | 007A18 | HCGS 324491 | NONE | N/A | N/A | |
| | 007E18 | HCGS 324492 | NONE | N/A | N/A | |

158

19:ACI TROY

| TGN | OE | CKT ID | ALARM STATUS | CSU_A | CSU_Z | MISC |
|---|---|---|---|---|---|---|
| 019 | 004E19 | HCGS 324493 | NONE | N/A | N/A | TROY TGN 634 |
| | 005E19 | HCGS 324494 | NONE | N/A | N/A | |
| | 004E13 | HCGS 324495 | NONE | N/A | N/A | |
| | 005E13 | HCGS 324496 | NONE | N/A | N/A | |
| | 006E14 | HCGS 324497 | NONE | N/A | N/A | |

CALL ACI, CHOOSE OPTION 2 FOR TROUBLE REFERRALS.

```
                              CIRCUIT DETAILS
CKT S  /HCGS/324230    /MB                       A TROYMIUOWOO Z DTRTMIBL6CD
CLO MIS123927001       DV    ACT IE IND   PRQ SSP TSP    MSC N MCO DTRTMIBHSHC
CAC SVF2BP3   CUST AMERITECHCOMMUNICATI PULS -- MW B EML OBJ     PG 01 OF 04
M SEQ A  LOCATION    SV EQPT/FAC   RR/TYPE    UNIT    A TLP Z    SBDV/MISC    TP
  002  E                  THIS IS  A PRO-CDS DESIGN                            N
  004  I                  MODEL =  8589   DESI GN = 2                          N
  006  X TROYMIUOWOO      LINE  C ODE=B8Z                                  N
  008  X TROYMIUOWOO      **SIGNAL   CODE=ESP* *                               N
  010  I    PROCESSED BY FLOWTHRU ID:HICAP-A VERS : 002    STAMP : 041295 130406 N
  012    TROYMIUOWOO      04DS6/    44  /                                      NI
  014                     HCG-                                                 NC
  016                                                      STA ADDR            N
  018                     TROY                             EU CITY             N
  020                     MI                               EU STATE            N
  022  W TROYMIUOWOO      DEMARC                                               S
  024    TROYMIUOWOO      POI                                                  XA
  026  W               X4 806         T3        2                IC            X#
  028                                                      OWNER=B-BX          XX
  030                                                      E=DTRTMIBLK07       XX
  032                             MB    0094.5              MI   0094.5 ZL    D#
  034    DTRTMIBLK07      EE31F                             F07/07   /0397    XZ
  036    DTRTMIBLK06      T3MAE412 040473.11    1916        F66/13   /08  /4  XM
CKT S  /HCGS/324230    /MB                       A TROYMIUOWOO Z DTRTMIBL6CD
CLO MIS123927001       DV    ACT IE IND   PRQ SSP TSP    MSC N MCO DTRTMIBHSHC
CAC SVF2BP3   CUST AMERITECHCOMMUNICATI PULS -- MW B EML OBJ     PG 02 OF 04
M SEQ A  LOCATION    SV EQPT/FAC   RR/TYPE    UNIT    A TLP Z    SBDV/MISC    TP
  038    DTRTMIBLK07      T1MBDX01 040483.02B  ACSA                            XH
  040    DTRTMIBLK07      T1MBDY01 040482.02C  CSSA2                           XH
  042    DTRTMIBLK07      T1MBDZ01 040482.02B  ESSA2                           XH
  044    DTRTMIBLK07      T1MBD901 040480.12A  1                               XH
  046    DTRTMIBLK07      T1MBD901 040480.12A  1-17                            XH
  048    DTRTMIBLK07              DCS55NNNSC                                   XF
  050    DTRTMIBLK07      T1MBD9Y1 040482.02B  0397        F66/12   /07  /4   XM
  052    DTRTMIBLK07                                       F07/07   /0397    EX
```

*Fig. 6a*

```
054 E  DTRTMIBLK07              /K07       /FE/DAB/  01/                                          N1
056 E  DTRTMIBLK07              035-16                              /                             N2
058 E  DTRTMIBLK07              T1 /                                                              N3
060    DTRTMIBLK07              T1MBDX01 040483.02B ACSA                                          EH
062    DTRTMIBLK07              T1MBDY01 040482.01C CSSA1                                         EH
064    DTRTMIBLK07              T1MBDZ01 040482.01B ESSA1                                         EH
066    DTRTMIBLK07              T1MBD801 040481.03A 1                                             EH
068    DTRTMIBLK07              T1MBD831 040481.03A 1-27                                          EH
070    DTRTMIBLK07                       DCS5NNNF7                                                F#
072 W  DTRTMIBLK07              T1MBD8S1 040482.01B 035-16               F93/03  /02 /44          EU
CKT S    /HCGS/324230   /MB                              A TROYMIUOWOO Z DTRTMIBL6CD
CLO MIS123927001        DV      ACT IE IND   PRQ SSP TSP    MSC N MCO DTRTMIBHSHC
CAC SVF2BP3   CUST AMERITECHCOMMUNICATI  PULS --  MW B EML OBJ     PG 03 OF 04
M SEQ A  LOCATION       SV EQPT/FAC   RR/TYPE    UNIT   A  TLP  Z   SBDV/MISC    TP
  074    DTRTMIBLK07                                                 F07/07  /035 EX
  076    DTRTMIBLK07   SD=TSLS- 5500                                               EX
  078    DTRTMIBLK07   $FEPMTYP E=ANSI403; FEPM=                                   EX
  080    DTRTMIBLK07   ON;DS1 F ORMAT MUST =ESF;                                   EX
  082    DTRTMIBLK07   NEPM=OFF                                                    EX
  084    DTRTMIBL               NCT2YGEEE                                          F#
  086 W  DTRTMIBL      T1ML1971  11CAB1        0114       F93/07  /06 /14          EM
  088 W  DTRTMIBL      T1IUJ222  IP03191235                                        P
  090    DTRTMIBL      $PM SM ARTJACK  S1=NA                                   PX
  092    DTRTMIBL      ,S2-1=DI SABLE,S2-2  =DISA                                  PX
  094    DTRTMIBL      BLE,S2-3 =DISABLE, S 2-4=E                                  PX
  096    DTRTMIBL      NABLE,S2  -5=ESF, S3= 7.5D.                                 PX
  098    DTRTMIBL      B, S4=SHO RT, S5=DISA BLE,S                                 PX
  100    DTRTMIBL      6=ON, S7= ENABLE                                            PX
  102 W  DTRTMIBL6CD   DEMARC                                                      S
  104                                                     STA ADDR                 N
  106                 11                                  EU FLR                   N
  108                 1129                                EU ROOM                  N
CKT S    /HCGS/324230   /MB                              A TROYMIUOWOO Z DTRTMIBL6CD
CLO MIS123927001        DV      ACT IE IND   PRQ SSP TSP    MSC N MCO DTRTMIBHSHC
CAC SVF2BP3   CUST AMERITECHCOMMUNICATI  PULS --  MW B EML OBJ     PG 04 OF 04
M SEQ A  LOCATION       SV EQPT/FAC   RR/TYPE    UNIT   A  TLP  Z   SBDV/MISC    TP
  110                 DETROIT                             EU CITY                  N
  112                 MI                                  EU STATE                 N
  114    DTRTMIBL6CD   04DU9/   1SN/                                               NI
  116    DTRTMIBL6CD   DTRTMIBL 6CD CONSUM ER                                      NX
```

*Fig. 6b*

EPN: BETHUNE (IT)

| EPN | HOST PORT | CKT ID | ALARM STATUS | CSU_A | CSU_Z | REMOTE PORT |
|---|---|---|---|---|---|---|
| 14 | 001 C 12 A | DHDZ 791565 | NONE | 144.151.178.37 | N/A | 008 A 02 A |
|  | 001 C 12 B | DHDZ 791566 | NONE | 144.151.178.38 | N/A | 008 A 02 B |
|  | 001 C 12 C | DHDZ 791567 | NONE | 144.151.178.39 | N/A | 008 A 02 C |
|  | 001 C 12 D | DHDZ 791568 | NONE | 144.151.178.40 | N/A | 008 A 02 D |

EPN: KALAMAZOO

| EPN | HOST PORT | CKT ID | ALARM STATUS | CSU_A | CSU_Z | REMOTE PORT |
|---|---|---|---|---|---|---|
| 25 | 001 C 11 A | DHDZ 708222 | NONE | 144.151.178.57 | N/A | 020 A 02 A |
|  | 001 C 11 B | DHDZ 708223 | NONE | 144.151.178.58 | N/A | 020 A 02 B |
|  | 001 C 11 C | DHDZ 708224 | NONE | 144.151.178.59 | N/A | 020 A 02 C |
|  | 001 C 11 D | DHDZ 708225 | NONE | 144.151.178.60 | N/A | 020 A 02 D |
| 26 | 001 E 01 A | DHDZ 708226 | NONE | 144.151.178.149 | N/A | 021 A 02 A |
|  | 001 E 01 B | DHDZ 708227 | NONE | 144.151.178.150 | N/A | 021 A 02 B |
|  | 001 E 01 C | DHDZ 708228 | NONE | 144.151.178.151 | N/A | 021 A 02 C |
|  | 001 E 01 D | DHDZ 708229 | NONE | 144.151.178.152 | N/A | 021 A 02 D |
| 27 | 002 B 11 A | DHDZ 708230 | NONE | 144.151.178.153 | N/A | 022 A 02 A |
|  | 002 B 11 B | DHDZ 708231 | NONE | 144.151.178.154 | N/A | 022 A 02 B |
|  | 002 B 11 C | DHDZ 708232 | NONE | 144.151.178.155 | N/A | 022 A 02 C |
|  | 002 B 11 D | DHDZ 708233 | NONE | 144.151.178.156 | N/A | 022 A 02 D |

EPN: SAGINAW

| EPN | HOST PORT | CKT ID | ALARM STATUS | CSU_A | CSU_Z | REMOTE PORT |
|---|---|---|---|---|---|---|
| 28 | 002 E 01 A | DHDZ 708234 | NONE | 144.151.178.25 | N/A | 023 A 02 A |
|  | 002 E 01 B | DHDZ 708235 | NONE | 144.151.178.26 | N/A | 023 A 02 B |
|  | 002 E 01 C | DHDZ 708236 | NONE | 144.151.178.27 | N/A | 023 A 02 C |
|  | 002 E 01 D | DHDZ 708237 | NONE | 144.151.178.28 | N/A | 023 A 02 D |
| 29 | 002 E 21 A | DHDZ 708238 | NONE | 144.151.178.41 | N/A | 024 A 02 A |
|  | 002 E 21 B | DHDZ 708239 | NONE | 144.151.178.42 | N/A | 024 A 02 B |
|  | 002 E 21 C | DHDZ 708240 | NONE | 144.151.178.43 | N/A | 024 A 02 C |
|  | 002 E 21 D | DHDZ 708241 | NONE | 144.151.178.44 | N/A | 024 A 02 D |
| 30 | 003 E 01 A | DHDZ 708242 | NONE | 144.151.178.121 | N/A | 025 A 02 A |
|  | 003 E 01 B | DHDZ 708243 | NONE | 144.151.178.122 | N/A | 025 A 02 B |
|  | 003 E 01 C | DHDZ 708244 | NONE | 144.151.178.123 | N/A | 025 A 02 C |
|  | 003 E 01 D | DHDZ 708245 | NONE | 144.151.178.124 | N/A | 025 A 02 D |
| 31 | 003 E 21 A | DHDZ 708246 | NONE | 144.151.178.137 | N/A | 026 A 02 A |
|  | 003 E 21 B | DHDZ 708247 | NONE | 144.151.178.138 | N/A | 026 A 02 B |
|  | 003 E 21 C | DHDZ 708248 | NONE | 144.151.178.139 | N/A | 026 A 02 C |
|  | 003 E 21 D | DHDZ 708249 | NONE | 144.151.178.140 | N/A | 026 A 02 D |

*Fig. 7a*

EPN: SOUTHFIELD

| EPN | HOST PORT | CKT ID | ALARM STATUS | CSU_A | CSU_Z | REMOTE PORT |
|---|---|---|---|---|---|---|
| 17 | 001 D 10 A | DHDZ 708302 | NONE | 144.151.178.17 | N/A | 013 A 02 A |
|  | 001 D 10 B | DHDZ 708303 | NONE | 144.151.178.18 | N/A | 013 A 02 B |
|  | 001 D 10 C | DHDZ 708304 | NONE | 144.151.178.19 | N/A | 013 A 02 C |
|  | 001 D 10 D | DHDZ 708305 | NONE | 144.151.178.20 | N/A | 013 A 02 D |
| 18 | 001 D 11 A | DHDZ 708306 | NONE | 144.151.178.33 | N/A | 014 A 02 A |
|  | 001 D 11 B | DHDZ 708307 | NONE | 144.151.178.34 | N/A | 014 A 02 B |
|  | 001 D 11 C | DHDZ 708308 | NONE | 144.151.178.35 | N/A | 014 A 02 C |
|  | 001 D 11 D | DHDZ 708309 | NONE | 144.151.178.36 | N/A | 014 A 02 D |
| 19 | 002 A 11 A | DHDZ 708310 | NONE | 144.151.178.49 | N/A | 015 A 02 A |
|  | 002 A 11 B | DHDZ 708311 | NONE | 144.151.178.50 | N/A | 015 A 02 B |
|  | 002 A 11 C | DHDZ 708312 | NONE | 144.151.178.51 | N/A | 015 A 02 C |
|  | 002 A 11 D | DHDZ 708313 | NONE | 144.151.178.52 | N/A | 015 A 02 D |
| 20 | 002 B 10 A | DHDZ 708314 | NONE | 144.151.178.113 | N/A | 016 A 02 A |
|  | 002 B 10 B | DHDZ 708315 | NONE | 144.151.178.114 | N/A | 016 A 02 B |
|  | 002 B 10 C | DHDZ 708316 | NONE | 144.151.178.115 | N/A | 016 A 02 C |
|  | 002 B 10 D | DHDZ 708317 | NONE | 144.151.178.116 | N/A | 016 A 02 D |
| 21 | 003 A 10 A | DHDZ 708318 | NONE | 144.151.178.129 | N/A | 017 A 02 A |
|  | 003 A 10 B | DHDZ 708319 | NONE | 144.151.178.130 | N/A | 017 A 02 B |
|  | 003 A 10 C | DHDZ 708320 | NONE | 144.151.178.131 | N/A | 017 A 02 C |
|  | 003 A 10 D | DHDZ 708321 | NONE | 144.151.178.132 | N/A | 017 A 02 D |
| 22 | 003 A 11 A | DHDZ 708322 | NONE | 144.151.178.145 | N/A | 018 A 02 A |
|  | 003 A 11 B | DHDZ 708323 | NONE | 144.151.178.146 | N/A | 018 A 02 B |
|  | 003 A 11 C | DHDZ 708324 | NONE | 144.151.178.147 | N/A | 018 A 02 C |
|  | 003 A 11 D | DHDZ 708325 | NONE | 144.151.178.148 | N/A | 018 A 02 D |

*Fig. 7b*

LATEST (TIMES) ALARM MESSAGE...                                    -MIC1 ALARM LOG-

| Date | Time | (n) | Msg |
|---|---|---|---|
| 12/29 | 13:30 | (1) | 12/29 13:29 ->03E12 SNC-LINK MINOR |
| 12/21 | 21:29 | (6) | 12/19 14:02 ->05A0401 PGATE-PT MINOR |
| 12/21 | 04:35 | (6) | 12/21 01:27 ->37_A-PNC FIBER-LK MINOR |
| 12/21 | 04:34 | (6) | 12/21 01:35 ->35_A-PNC FIBER-LK MAJOR |
| 12/21 | 04:34 | (6) | 12/21 01:35 ->37_A-PNC FIBER-LK MAJOR |
| 12/21 | 04:34 | (6) | 12/21 01:26 ->25A0101 SYS-LINK MINOR (@EPN 30-SAGINAW) |
| 12/21 | 04:34 | (4) | 12/21 01:37 ->38_A-PNC FIBER-LK MAJOR |
| 12/21 | 04:34 | (3) | 12/21 01:35 ->26A0101 SYS-LINK MINOR (@EPN 31-SAGINAW) |
| 12/21 | 04:21 | (7) | 12/21 01:26 ->36_A-PNC FIBER-LK MINOR |
| 12/21 | 04:21 | (6) | 12/21 01:26 ->38_A-PNC FIBER-LK MINOR |
| 12/21 | 04:21 | (6) | 12/21 01:26 ->35_A-PNC FIBER-LK MINOR |
| 12/21 | 04:21 | (5) | 12/21 01:40 ->03E21C DS1-FAC MINOR (@EPN 31-SAGINAW) |
| 12/21 | 04:20 | (5) | 12/21 01:27 ->PN_28 EXP-PN MAJOR |
| 12/21 | 04:20 | (5) | 12/21 01:35 ->36_A-PNC FIBER-LK MAJOR |
| 12/21 | 04:20 | (4) | 12/21 01:26 ->23A0101 SYS-LINK MINOR (@EPN 28-SAGINAW) |
| 12/21 | 04:20 | (3) | 12/21 01:39 ->PN_31 EXP-PN MAJOR |
| 12/21 | 04:20 | (3) | 12/21 01:41 ->03E20 SN-CONF MAJOR (EPN 31-SAGINAW) |
| 12/21 | 04:20 | (4) | 12/21 01:35 ->PN_30 EXP-PN MAJOR |
| 12/21 | 04:20 | (2) | 12/21 01:40 ->02E20 SN-CONF MAJOR (EPN 29-SAGINAW) |
| 12/21 | 04:18 | (2) | 12/21 01:26 ->26A01 EXP-INTF MINOR (@EPN 31-SAGINAW) |
| 12/21 | 04:18 | (2) | 12/21 01:29 ->24A0101 SYS-LINK MINOR (@EPN 29-SAGINAW) |
| 12/21 | 02:15 | (4) | 12/21 01:40 ->02E01A DS1-FAC MINOR (EPN 28-SAGINAW) |
| 12/21 | 02:15 | (3) | 12/21 01:35 ->03E03 SN-CONF MAJOR (EPN 30-SAGINAW) |
| 12/21 | 02:10 | (3) | 12/21 01:37 ->PN_29 EXP-PN MAJOR |
| 12/21 | 02:10 | (3) | 12/21 01:39 ->03E21D DS1-FAC MINOR (EPN 31-SAGINAW) |
| 12/21 | 02:05 | (2) | 12/21 01:44 ->25A01 EXP-INTF MINOR (@EPN 30-SAGINAW) |
| 12/21 | 02:03 | (2) | 12/21 01:39 ->02E21A DS1-FAC MINOR (EPN 29-SAGINAW) |
| 12/21 | 02:01 | (2) | 12/21 01:42 ->02E03 SN-CONF MAJOR (EPN 28-SAGINAW) |
| 12/21 | 02:01 | (2) | 12/21 01:39 ->02E21B DS1-FAC MINOR (EPN 29-SAGINAW) |
| 12/21 | 02:01 | (2) | 12/21 01:39 ->02E21D DS1-FAC MINOR (EPN 29-SAGINAW) |

*Fig. 8*

- MIC1 AGENT STATUS -
(AS OF THU DEC 30 08:35:25 1999 CDT)

| SPLIT/SKILL | AGENTS ACTIVE | QUEUED CALLS | LONGEST WAIT | GATE NAME |
|---|---|---|---|---|
| 99 | 2 | 0 | 0:00 | SYSTEM PORTS |
| 200 | 115 | 57 | 3:44 | STHFLD UNIV 200 |
| 204 | 1 | 0 | 0:00 | MI CSST |
| 231 | 3 | 0 | 0:00 | HOTC INBOUND |
| 256 | 4 | 0 | 0:00 | MI ASST COACH |
| 260 | 1 | 0 | 0:00 | KALAMAZOO ACE |
| 263 | 1 | 0 | 0:00 | SOUTHFIELD ACE |
|  | 127 | 57 | 3:44 | ** TOTALS ** |

*Fig. 9*

BETHUNE-EPN 14
(CABINET 8)

| PORT CARD | 08A03 | 08A04 | 08A05 | 08A06 |
|---|---|---|---|---|
| 1 | 59400 | 59424 | - - | - - |
| 2 | 59401 | 59425 | - - | - - |
| 3 | 59402 | 59426 | - - | - - |
| 4 | 59403 | 59427 | - - | - - |
| 5 | 59404 | 59428 | - - | - - |
| 6 | 59405 | 59429 | - - | - - |
| 7 | 59406 | 59430 | - - | - - |
| 8 | 59407 | 59431 | - - | - - |
| 9 | 59408 | 59432 | - - | - - |
| 10 | 59409 | 59433 | - - | - - |
| 11 | 59410 | 59434 | - - | - - |
| 12 | 59411 | 59435 | - - | - - |
| 13 | 59412 | 59436 | - - | - - |
| 14 | 59413 | 59437 | - - | - - |
| 15 | 59414 | 59438 | - - | - - |
| 16 | 59415 | 59439 | - - | - - |
| 17 | 59416 | 59440 | - - | - - |
| 18 | 59417 | 59441 | - - | - - |
| 19 | 59418 | 59442 | - - | - - |
| 20 | 59419 | - - | - - | - - |
| 21 | 59420 | - - | - - | - - |
| 22 | 59421 | - - | - - | - - |
| 23 | 59422 | - - | - - | - - |
| 24 | 59423 | - - | - - | - - |

*Fig. 10*

- MIC1 TRAFFIC LOAD -
(PAST HOUR / PEAK FOR THU DEC 30 08:35:25 1999 CDT)

*Fig. 11*

| PORT NETWORK | NAME | TDM OCC | PN OCC | ......20......40......60......80......100 |
|---|---|---|---|---|
| 1 | HOST CABINET 1 | 16 | 5 | |
| 2 | HOST CABINET 2 | 10 | 6 | |
| 3 | HOST CABINET 3 | 6 | 4 | |
| 4 | HOST CABINET 4 | 6 | 4 | |
| 5 | HOST CABINET 4 | 7 | 5 | |
| 6 | HOST CABINET 5 | 2 | 1 | |
| 7 | HOST CABINET 5 | 9 | 6 | |
| 8 | HOST CABINET 6 | 3 | 2 | |
| 9 | HOST CABINET 6 | 6 | 4 | |
| 10 | HOST CABINET 7 | 3 | 2 | |
| 11 | HOST CABINET 7 | 3 | 2 | |
| 23 | HOST CABINET 19 | 0 | 0 | |
| 24 | HOST CABINET 19 | 2 | 2 | |
| 32 | HOST CABINET 27 | 3 | 2 | |
| 12 | HOST CABINET 28 | 6 | 4 | |
| 13 | HOST CABINET 29 | 8 | 5 | |
| 14 | BETHUNE | 0 | 0 | |
| 25 | KALAMAZOO | 2 | 7 | |
| 26 | KALAMAZOO | 4 | 11 | |
| 27 | KALAMAZOO | 2 | 7 | |
| 28 | SAGINAW | 3 | 8 | |
| 29 | SAGINAW | 4 | 11 | |
| 30 | SAGINAW | 2 | 6 | |
| 31 | SAGINAW | 1 | 2 | |
| 17 | SOUTHFIELD | 2 | 6 | |
| 18 | SOUTHFIELD | 2 | 5 | |
| 19 | SOUTHFIELD | 3 | 10 | |
| 20 | SOUTHFIELD | 2 | 7 | |
| 21 | SOUTHFIELD | 2 | 5 | |
| 22 | SOUTHFIELD | 2 | 7 | |

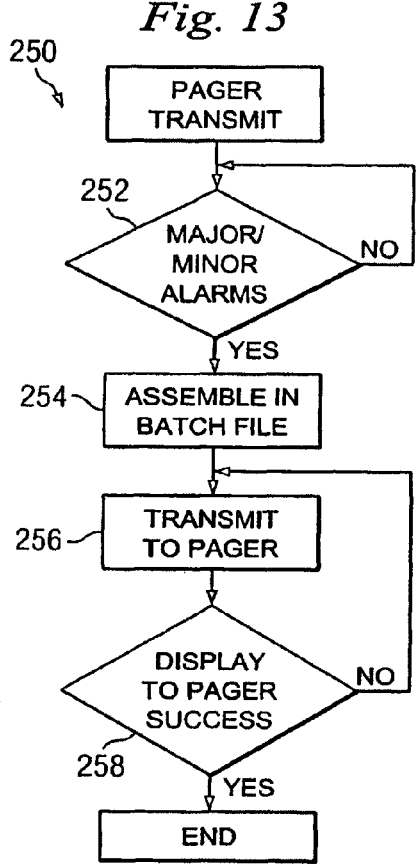
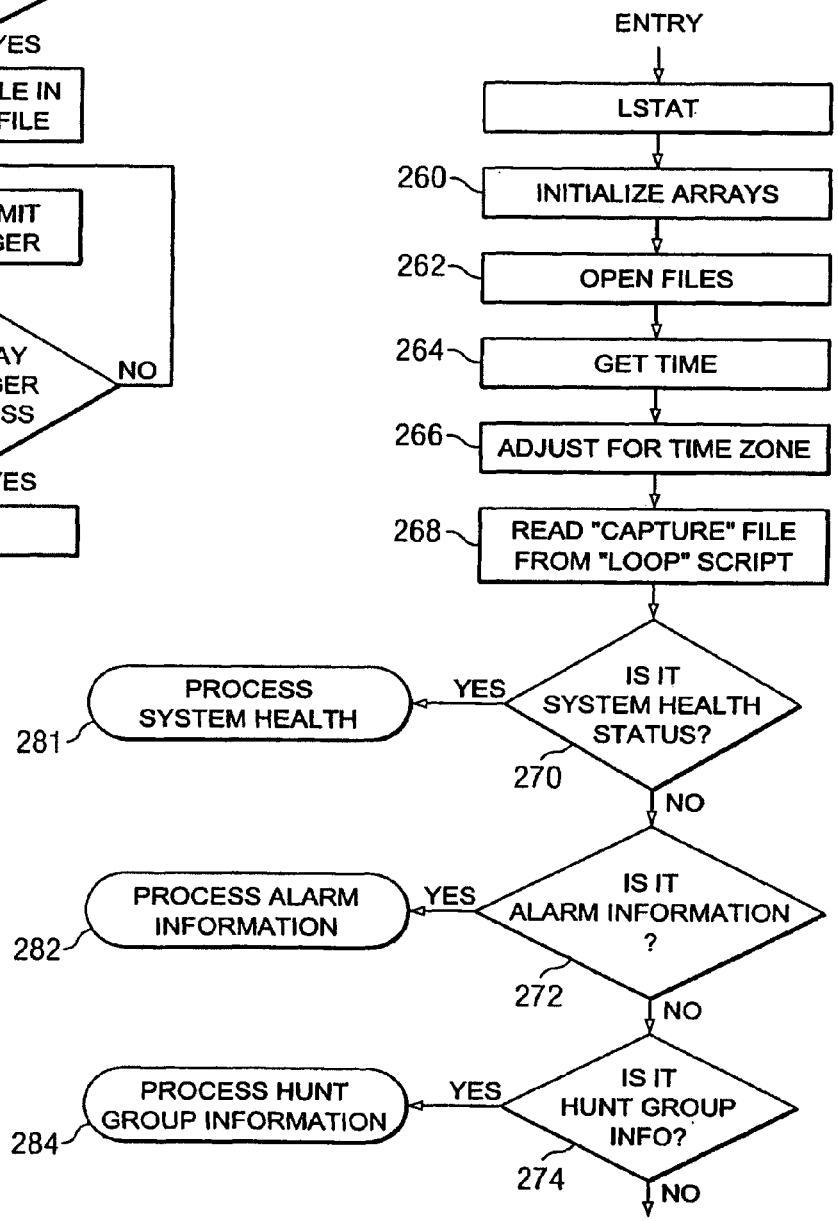

WEB-BASED NETWORK MONITORING TOOL

CROSS REFERENCE TO RELATED APPLICATION

This application is a continuation of U.S. patent application Ser. No. 11/122,812, filed May 5, 2005 now U.S. Pat. No. 7,197,131, which is a continuation of U.S patent Ser. No. 09/532,208 now U.S. Pat. No. 6,970,552, filed Mar. 22, 2000; both of which are hereby incorporated in their entirety by reference.

BACKGROUND OF THE INVENTION

1. Field of the Invention

The present invention relates to a monitoring tool for use in a telecommunications system which automatically monitors one or more automatic call distributors (ACD) and provides an indication of the status of such ACDs in essentially real time.

2. Description of the Prior Art

Automatic call distributors (ACD) are known in the art. Such ACDs are telecommunications devices, used by various manufactures and service providers, to handle a relatively huge volume of calls and distribute them among a relatively few agents. Such ACDs are known to be networked and interconnected with interactive voice response units (IVR). As such, calls to a company's customer service telephone are provided with menu options by the IVR depending on the type of service required. The caller's selection is then used to route the call to the appropriate ACD in the network. One or more agent groups are normally affiliated with each of the ACDs in the network. The call is routed to an agent group and held until one of the agents is available to take the call. The calls are normally distributed to the agents according to various criteria. For example, the call may be routed to the agent in the agent group that has been idle the longest. Alternatively, the call may be routed to the agent based on the caller's telephone number or the number dialed by the caller. If all of the agents are busy, the call may be held in queue or routed to another agent group, for example, for a predetermined time period or the caller may be requested to leave a voice mail message for later call back.

Such ACDs are known to be provided by a number of manufacturers. For example, Lucent Technologies, Rockwell, Toshiba and STE are all known manufacturers of ACDs. An important aspect of such ACDs is the efficiency by which the incoming service calls are handled. As such, all of the providers of such ACDs are known to provide online monitoring of the ACDs. Unfortunately, such systems are monitored manually on a query basis. In other words, service technicians must manually query or poll each of the ACDs to determine its status, which can be time consuming. Once an alarm condition is detected, a service technician is subsequently dispatched to correct the problem. Unfortunately, with such a system, an ACD can be out of service for several hours and perhaps days depending on the location of the service technician relative to the ACD and the severity of the problem. While such ACDs are out of service, the call answering time potentially increases, perhaps leading many customer calls unanswered, potentially causing customer ill will toward the company and increased call traffic when the ACD is returned to service. Thus, there is a need for a monitoring system which lowers the response time and provides continuous and automatic monitoring of the various conditions in order to reduce the amount of time such ACDs are out of service.

BRIEF DESCRIPTION OF THE DRAWINGS

Various objects and advantages of the present invention will be realized upon consideration of the following specification and attached drawing wherein:

FIG. 4 is an exemplary home web page for an ACD in accordance with the present invention which provides hyperlinks to various web pages for all incoming and outgoing trunk groups connected to the ACD as well as auxiliary equipment associated with the ACD.

FIGS. 5A, 5B represents an exemplary web page, linked to the web page illustrated in FIG. 4, illustrating the status of incoming trunk groups coupled to the ACD illustrated in FIG. 4.

FIGS. 6A, 6B represents an exemplary web page, linked to the web page illustrated in FIGS. 5A, 5B, illustrating the trunk inventory record keeping system (TIRKS) for a selected trunk group illustrated in FIGS. 5A and 5B.

FIGS. 7A, 7B represents an exemplary web page, linked to the exemplary home web page illustrated in FIG. 4 illustrating the status of the various expansion port network (EPN) connected to the ACD illustrated in FIG. 4.

FIG. 8 represents an exemplary web page linked to the home web page illustrated in FIG. 4, illustrating an alarm log for the ACD illustrated in FIG. 4.

FIG. 9 is an exemplary web page, linked to the ACD home web page illustrated in FIG. 4 illustrating the ACD agent status.

FIG. 10 is an exemplary web page, linked to the EPN web page illustrated in FIGS. 7A, 7B which illustrates the EPN cabinet stations and port assignments.

FIG. 11 is an exemplary web page, linked to the home web page illustrated in FIG. 4, which illustrates the traffic or load of all customer care centers (CCC) and inbound traffic to the ACD in FIG. 4.

FIG. 13 is a flow diagram depicting exemplary software for transmitting alarm information to a paging platform.

FIGS. 14a-14c and 15-20 include flow diagrams depicting exemplary software for processing data captured from the ACDs.

DETAILED DESCRIPTION OF THE INVENTION

The present invention relates to a monitoring tool for use with one or more automatic call distributors (ACD) which automatically and continuously polls or queries the ACDs to monitor not only alarm conditions but other conditions, such as agent staffing levels, call answering time, call routing and traffic conditions. Such continuous and automatic querying of the ACD in accordance with the present invention is thus able to improve the overall efficiency of such ACDs by improving the service response time of such ACDs. In accordance with one aspect of the invention, the status of the ACDs may be directed to a website, for example, on an enterprise Intranet website to enable any of the company representatives with access rights to access the real time performance of the ACD network from any location. Another aspect of the invention is the ability to provide automatic paging for predetermined alarm status condition.

Although the present invention is illustrated and described relative to Lucent Definity G3R ACDs, the principles of the present invention are applicable to virtually any ACD or other telecommunications equipment which stores status data.

Figure 1:
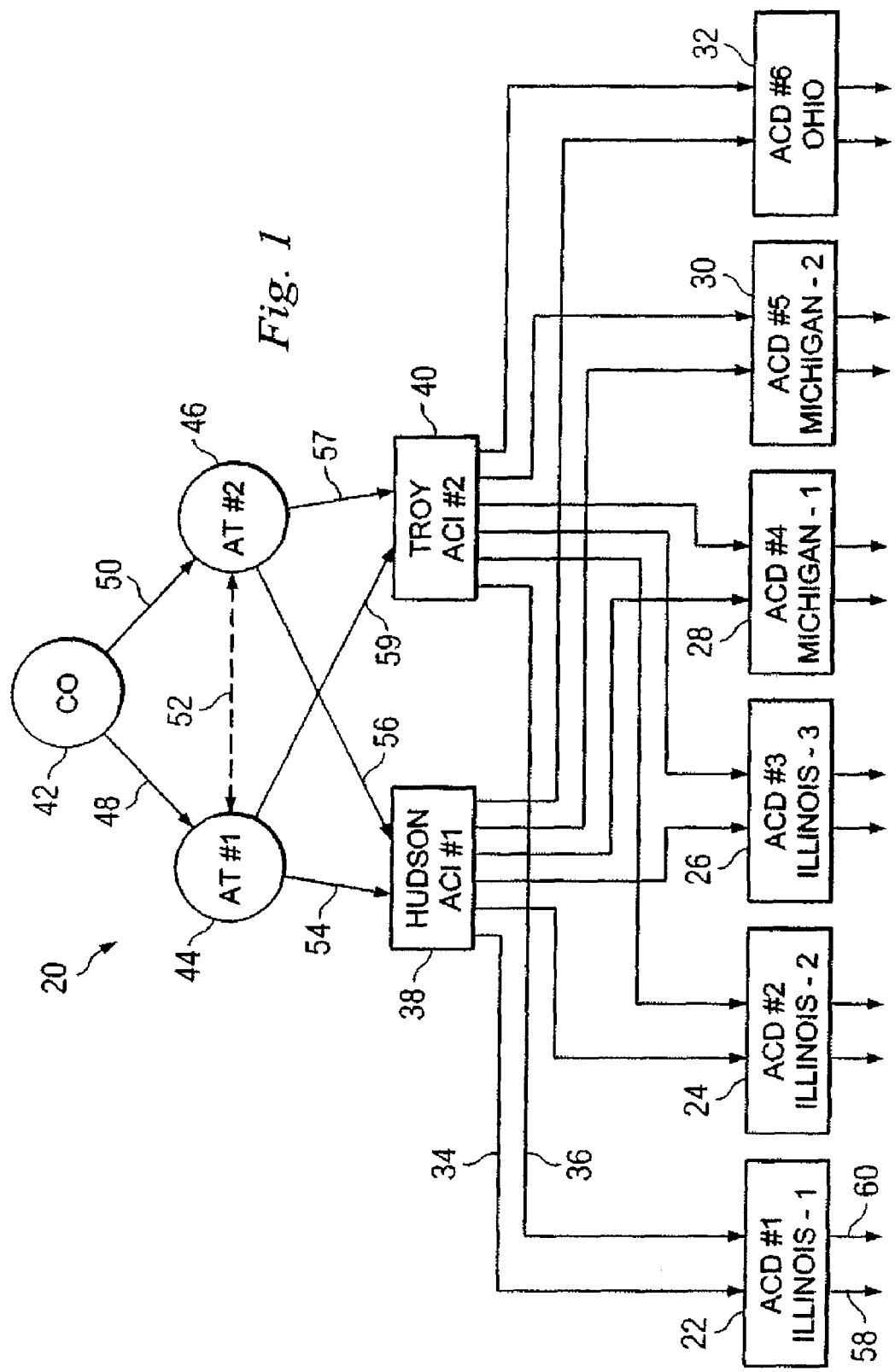
FIG. 1 is a block diagram of an inbound and outbound distribution system for a network of automatic call distributors (ACD) in accordance with the present invention.

An exemplary block diagram illustrating the inbound and outbound trunks for an exemplary network of ACDs is illustrated in FIG. 1. As shown, the exemplary network, generally identified with the reference numeral 20, is shown with, for example, six (6) exemplary ACDs 22, 24, 26, 28, 30 and 32. As shown, the exemplary ACD network 20 may contain ACDs in different states in different regions in the country. For example, as shown in FIG. 1, three ACDs 22, 24 and 26 may be located in Illinois, designated as Illinois-1; Illinois-2 and Illinois-3, while two ACDs 28 and 30 are located in Michigan and designated as Michigan-1 and Michigan-2. The sixth ACD may be located in Ohio and designated Ohio.

Each ACD 22, 24, 26, 28, 30 and 32 may include two inbound trunk groups and two outbound trunk groups. For example, the ACD 22 may include two inbound trunk groups 34 and 36 from independent long distance carrier switches 38 and 40. In order to improve the inbound reliability of the system, calls placed to a central office 42 may be routed to two different access tandems 44 and 46 by way of a plurality of trunks 48 and 50. The access tandems 44 and 46 may also be tied together by way of intermachine trunks (IMT) 52. Separate trunk groups 54, 56, 58 and 59 from each of the access tandems 44 and 46 are applied to each of the long distance carrier switches 38 and 40. In particular, each access tandem is connected to both of the long distance carrier switches 38 and 40 by way of a plurality of trunk groups 54 and 56. Similarly, the access tandem 46 may be connected to the long distance carrier switches 38 and 40 by way of a plurality of trunk groups 56 and 58. With such a configuration, should one of the access tandems 44 or 48 fail, calls can be routed through the other access tandem since both access tandems feed each of the long distance carrier switches 38 and 40; and the access tandems 44 and 46 are tied together by way of the IMT 52. The exemplary in bound distribution system may also be configured to minimize service loss upon failure of one of the long distance carrier switches 38 and 40. In particular, as mentioned above, each of the ACDs 22, 24, 26, 28, 30 and 32 has two incoming trunk groups 34 and 36; one from each of the long distance carrier switches 38 and 40 respectively. Thus, should one of the long distance carrier switches 38, 40 fail, calls can be routed to the appropriate ACD 22, 24, 26, 28, 30 and 32 by the other long distance carrier switch. Similarly, should problems develop with one of the trunk inbound trunk groups 34 or 36, calls to the ACD can be re-routed by way of the other trunk groups to provide improved overall reliability of the system.

Each of the ACDs 22, 24, 26, 28, 30 and 32 may also provided with, for example, two outgoing trunk groups. For example, the ACD 22 may be provided with the outgoing trunk groups 58 and 60. These outbound trunk groups enable outbound calls from the ACDs 22, 24, 26, 28, 30 and 32 to be directed to central offices (not shown). In order to provide reliability of outgoing calls from each of the ACDs 22, 24, 26, 28, 30 and 32, each of the outgoing trunk groups 58 and 60 are directed to a separate central office (not shown).

Figure 2:
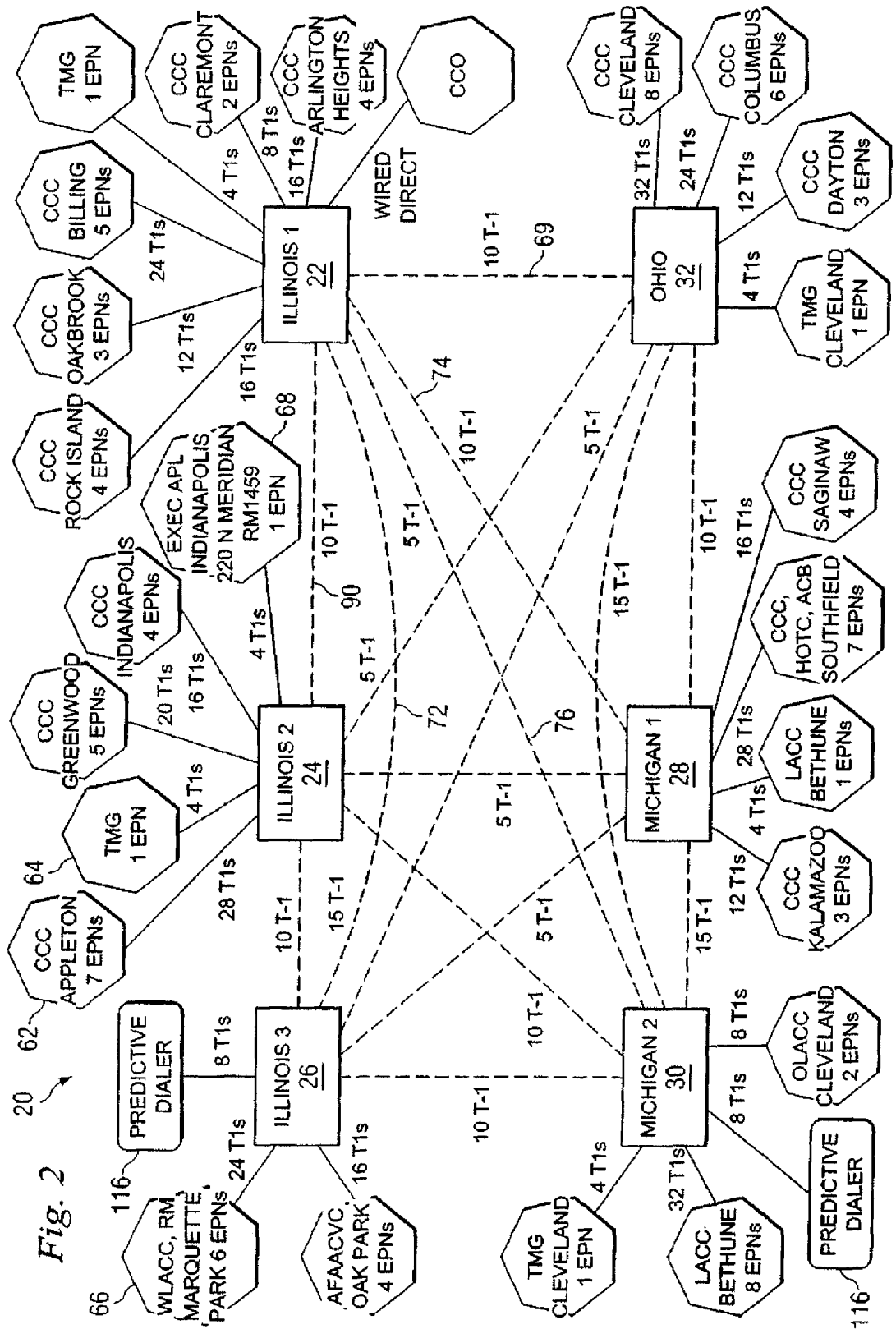
FIG. 2 is an exemplary block diagram of a network of ACDs with exemplary agent groups associated with each of the ACDs according to the present invention.

FIG. 2 illustrates a block diagram of an exemplary ACD network 20. As mentioned above, the ACD network in accordance with an exemplary embodiment of the invention includes six ACDs 22, 24, 26, 28, 30 and 32. The exemplary ACD network 20 may be configured to route calls, for example, to approximately 6,000 agents, distributed in one or more regions around the country. Each ACD 22, 24, 26, 28, 30 and 32 may include one or more customer care centers (CCC) for handling various customer services, generally identified with the reference numeral 62. Each CCC 62 may include one or more expansion port networks (EPN). Each EPN may be used to route calls to a plurality of agents, for example, 90 agents. In addition to the CCCs 62, each ACD 22, 24, 26, 28, 30 and 32 may utilize EPNs for special purpose applications, such as training, generally identified with the reference numeral 24, collections, generally identified with the reference numeral 66 and, for example, executive applications, generally identified with the reference numeral 68.

As discussed above, each of the ACDs 22, 24, 26, 28, 30 and 32 is fed with two incoming trunk groups 34 and 36 (FIG. 1) and two outgoing trunk groups 58 and 60. The outgoing trunk groups may be used for customer call back or transferring calls to different ACDs or CCC. In addition, each of the ACDs 22, 24, 26, 28 and 30 may be connected to the other five ACDs by a number of trunk groups. For example, the ACD 22 may be connected to the ACD 32 by way of an intermachine trunk group (IMT) 68. Similarly, the ACD 22 may be connected to the ACDs 24, 26, 28 and 30 by way of IMT groups 70, 72, 74 and 76. As such, should one of the ACDs or trunk groups fail, calls can be routed by way of the IMTs to other ACDs in the network.

Figure 3:
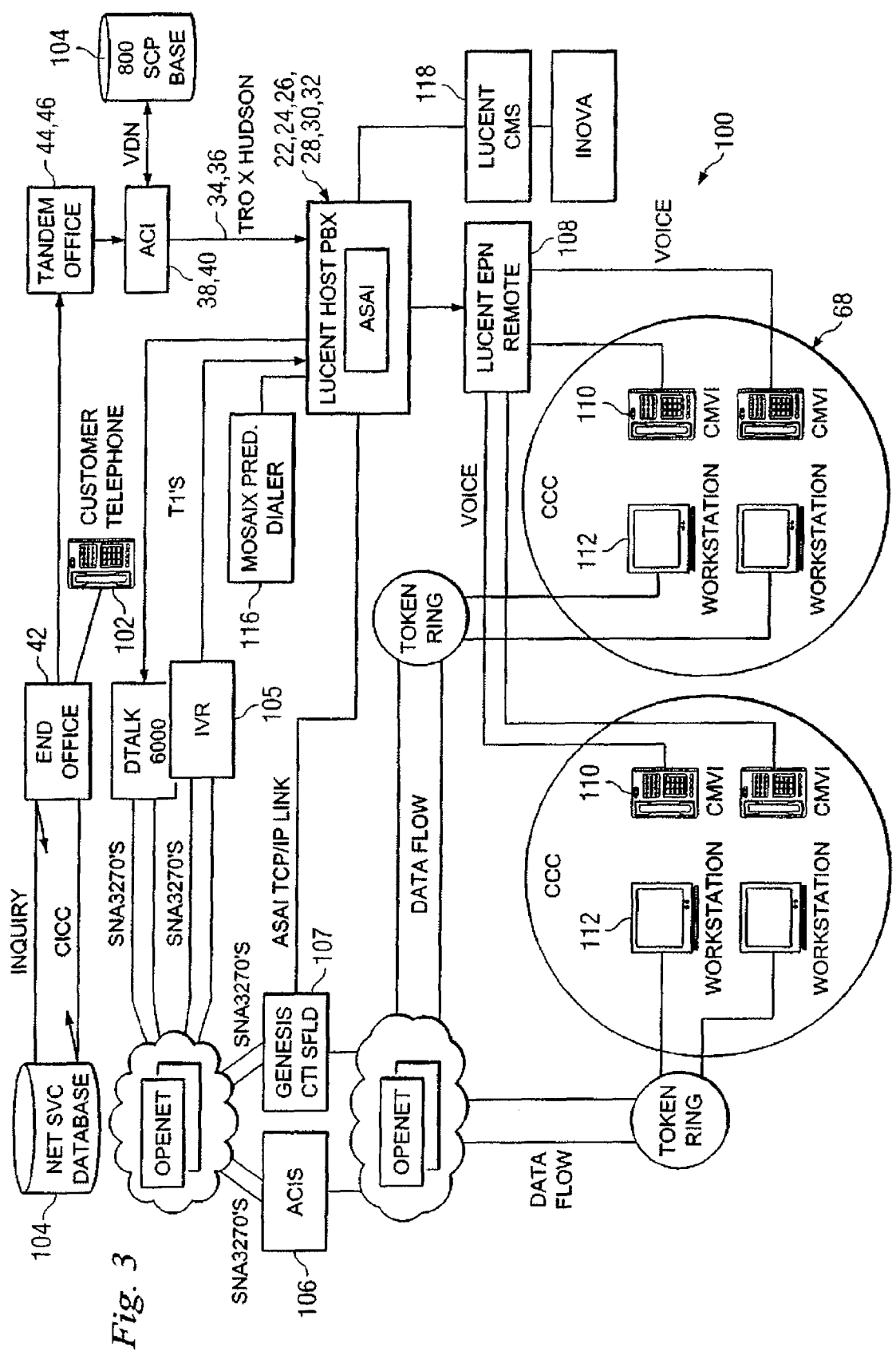
FIG. 3 is a detailed block diagram of a single ACD in accordance with the present invention.

FIG. 3 is a block diagram of an exemplary block diagram of a consumer voice network, generally identified with the reference numeral 100. For example, 800 number calls placed from a telephone 102 are directed to a central office, for example, the central office 42. The network service database 104 at the central office 42 determines the responsible organization for handling the call. In particular, the 800 number is looked up in the database 104, and an appropriate carrier identification code (CIC) is returned. In this example, since the call is directed to an 800 number, the network service database 104 will return a CIC directing that the calls be directed to an access tandem 44, 46 and a long distance carrier switch, for example, the long distance carrier switches 38 and 40. Each long distance carrier switch 38 and 40 includes a service control point (SCP) data base 104 used to look up the 800 number and direct the call to one of the ACDs 22, 24, 26, 28, 30 and 32 by way of one of two incoming trunk groups 34 and 36.

Initially the call is routed to an interactive voice response unit 106, for example, an IBM Direct Talk 6000, where the caller may be given various voice menu options in which the customer is directed to respond by way of the touch-tone telephone 102. In addition, the customer may be required to key in a telephone number. The information input by the customer is then looked up on a database, such as an Ameritech Customer Information System (ACIS) data base 106 containing customer records. The customer record information may then be provided to a server 108, used to provide the information back to the ACD 22, 24, 26, 28, 30 and 32 and display the information on the screen of the next available agent. The call and the above-mentioned information are then routed to an appropriate CCC 68. In particular, the calls are routed to an EPN 108, which, in turn, routes the calls to the next available agent. Each agent is provided with a work station 112. All the work stations may be connected together in a network, for example a token ring network. The customer records may then be "screen popped" onto the agents work stations 112, when the agent picks up the call.

Other options may be provided with the ACDs 22, 24, 26, 28, 30 and 32. For example, a predictive dialer 116 may be provided and connected to the ACD 22, 24, 26, 28, 30 and 32. The predictive dialer, 116 may be used for automatic dialing for various purposes, such as collections. As shown in FIG. 2, the ACDs 26 and 30 are provided with predictive dialers. In addition, a call management system (CMS) 118 may be provided with each ACD 22, 24, 26, 28, 30 and 32. The CMS 118 collects data from the ACD 22, 24, 26, 28, 30 and 32 and stores the data for 24 hours. The data collected by the CMS 118 is available by way of a dial-up modem.

As mentioned above, each ACD 22, 24, 26, 28, 30 and 32 may be used to route calls to one or more EPNs 108 (FIG. 3). A typical single EPN may be used to direct calls to, for example, 90 customer service agents. Thus, any time there is an outage related to one of the ACDs 22, 24, 26, 28, 30 or 32, several problems can result. Such an outage causes an interruption of customer service or other function associated with the ACD. In addition, such outages idle a relatively significant number of customer service agents. Depending on the severity of the outage and availability of service technicians, such outages can thus be substantial. As such, various vendors of ACDs, such as Lucent Technologies, have developed software which allows the status of the ACD 22, 24, 26, 28, 30 and 32 to be stored and thus be manually polled by way of a dial-up modem with standard communications software to ascertain the status of the ACDs 22, 24, 26, 28, 30 and 32. With such software, it is necessary to manually poll the ACDs 22, 24, 26, 28, 30 and 32 on a periodic basis. For a network of ACDs, for example, as illustrated in FIG. 2, a considerable amount of man power is required to perform the manual polling of the ACDs 22, 24, 26, 28, 30 and 32. In addition, such systems are reactive. In other words, once an alarm condition is detected, a service technician is subsequently dispatched to correct the problem. Unfortunately with such prior art systems, an ACD can be out of service for several hours and perhaps days depending on the severity of the problem and the location of the service technician relative to the ACD 22, 24, 26, 28, 30 and 32.

In order to solve this problem, the present invention automatically and continuously polls or queries each of the ACDs 22, 24, 26, 28, 30 and 32 on a periodic basis, for example every two minutes, and provides the status of the ACDs. The system may also be used to monitor the load balance on each of the ACDs 22, 24, 26, 28, 30 and 32 as well as various other attributes of the system, for example, the call traffic to each of the agents, and the average amount of wait time per call. This information may then be transferred, for example, over a secure line, for example, to a corporate Intranet, and displayed by way of a conventional web browser. As known in the art, such corporate Intranet networks are normally protected by a corporate fire wall, which only enables authorized users to access the corporate Intranet. As such, anyone with access rights to the corporate Intranet can access the ACD status information over the Internet from virtually anywhere in the world. By providing automatic and continuous polling of the ACDs, the status of ACDs can be detected and adjustments made to correct problems before they happen.

Exemplary web pages in accordance with the present invention, adapted to be displayed by way of a conventional web browser, such as the Internet Explorer and Netscape, are illustrated in FIGS. 4-11. Referring to FIG. 4, an exemplary ACD home page for the ACD 28 is illustrated and generally identified with the reference numeral 130. Home pages for the remaining ACDs 22, 24, 26, 30 and 32 would be similar. The ACD home page 130 may be provided with three data boxes; a traffic load data box 132; an alarm status data box 134 and a current system status data box 136.

The traffic load data box 132 is adapted to provide the traffic load of a particular ACD and in particular the traffic load of all of the various trunks connected to the ACD including inbound, outbound and intermachine trunks as well as information on the EPNs and other devices connected to the ACD, such as an IVR. The traffic load data box 132 may be provided with five columns 138, 140, 142, 144 and 146. Column 138 relates to the trunk group connected to the particular ACD. In particular, as mentioned above, each of the ACDs 22, 24, 26, 28 and 30 is fed from inbound trunks from the long distance carrier switches 38 and 40 (FIG. 1), identified, for example, as Hudson and Troy, respectively as well as the intermachine trunks (IMT) connected to the ACD 28 from each of the other ACDs 22, 24, 26, 28, 30 and 32. Column 138 also lists the outbound feeds for each ACD (i.e., OUT DETROIT and OUT SOUTHFIELD) as well as supplemental services, such as a direct inline dial (DID), an interactive voice response (IVR) unit and the contact quality center (CQC). Column 140 may be used to refer to the number of trunks associated with each of the trunk groups identified in column 138. Column 142 may be used to identify the number of trunks out of service, while column 144 may be used to display the percent occupancy rate of the various trunk groups.

In accordance with an important aspect of the invention, traffic load information for all the inbound and outbound trunks to the ACD as well as to the IVR may be displayed graphically in column 146, for example, in the form of a bar graph. For example, as shown in FIG. 4 for the Troy trunk group, identified in row 150 and column 144, a 59% occupancy rate is indicated. This 59% occupancy rate represents the traffic load for the incoming trunk lines from the Troy long distance carrier switch 40 (FIG. 1).

In one embodiment of the invention, different colors may be used to provide quick visual indication of the occupancy rate. For example, the color green may be used to display occupancy rates up to 80% while a different color such as yellow may be used to display occupancy rates, for example, greater than 80%. In this way, the load balance of all trunk groups connected to each of the ACDs 22, 24, 26, 28, 30 and 32 can be quickly checked at a glance by just monitoring column 146 and noting the specific color used for the bar graph.

In addition, to the trunk groups connected to the various ACDs 22, 24, 26, 28, 30 and 32, the traffic load data block 130 may also be used to provide access to associated equipment, such as EPNs and CQC (contact quality center). As will be discussed in more detail below, each of the entries in column 138 of the traffic load data box 130 may be hyperlinked to successive web pages which provide more detailed information. For example, FIGS. 5A and 5B illustrate an exemplary web page, activated by way of the hyperlink for the Troy trunk group. In particular, if the "Troy" hyperlink in column 138 and row 150 of the load balance data box 130 is clicked on, more detailed information regarding the trunk groups connected between Troy and the ACD 28 is provided. For example, FIG. 4, column 140 indicates that Troy has 708 trunks. FIG. 5A provides the data for those 708 trunks. For example, with reference to FIGS. 5A and 5B, six (6) trunk groups (TROY TGN 623, 626, 627, 629, 624, 634) are shown from the long distance carrier switch 40 (FIG. 1) at Troy to the ACD 28. Each trunk group contains five ISDN-PRI lines, which each contain 24 circuits to provide a total of 708 trunks between the long distance carrier switch 40 and the ACD 28. The web page illustrated in FIGS. 5A and 5B may be broken into a number of data boxes 150, 152, 154, 156, 158 and 160. Each data box 150-160 may be used to display information regarding a single trunk group, which, as mentioned above, may display five ISDN-PRI lines.

Each of the data boxes 150-160 may be provided with a plurality of columns. The first column 162 may be used to represent the trunk group number (TGN). The second column may be used to represent office equipment (OE). The third column may be used to provide the circuit identification numbers and may be hyperlinked to local assignment information for each circuit, for example, as illustrated in FIGS. 6A and 6B. The alarm status may be provided in column 168 for each of the ISDN-PRI lines. The columns 171 and 173 may be used for miscellaneous information, such as smart jacks, if applicable.

An important aspect of one embodiment of the invention relates to the integration of other data, which may be other dynamic data not retrieved from the ACD, or static data, such as the local circuit assignments and records. In particular, the trunk inventory record keeping system (TIRKS) data as illustrated in FIGS. 6A and 6B may be hyperlinked to the trunk group data illustrated in FIGS. 5A and 5B. Thus, when alarm conditions are detected, the TIRKS data is readily available, for example, on an enterprise intranet website. As such, trouble shooting of alarm conditions is greatly reduced.

Returning to the ACD home page illustrated in FIG. 4, an "ALARM STATUS" data box 134 may also be provided. As currently shown, the alarm status box 134 indicates that there are no alarms (i.e. "There are no alarms"). The alarm status box 134 may be used to represent alarms which may be flashing and/or displaying different colors. For example, minor alarms may be displayed in yellow while major alarms are displayed in red. The alarm status data box 134 may be hyperlinked to a historical alarm log, for example as illustrated in FIG. 8, which maintains the status of alarms for a predetermined period of time, such as 30 days.

As mentioned above, the ACD home page 130 may also be provided with a "current system status" data box 136 which gives different types of useful information regarding the call traffic on the system, as well as other useful information regarding the system. For example, the current system status data box 136, as shown, indicates that there are 233 agents active and that there are 68 calls in the queue and the longest call has been in the queue for 10 minutes, 12 seconds. The current system status box 136 may contain a hyperlink to an agent status web page, for example, as generally shown in FIG. 9. The agent status web page may be used to provide different information regarding the agent status. For example, the agent status web page may provide information regarding the skill level of the agent, for example as provided in column 170, the number of agents active, as indicated in column 172, the number of calls in the queue as shown in column 174 and the longest wait for a waiting call, for example as illustrated in column 176, as well as information regarding the name of the gate or functional representation of a call queue.

As mentioned above, the ACD home page 130, in addition to providing an information relating to the trunks connected to a particular ACD 22, 24, 26, 28, 30 and 32, may also be used to provide information regarding equipment connected to the ACDs, such as EPNs. As mentioned above, one or more customer care centers (CCC) may be connected to each of the ACDs 22, 24, 26, 28, 30 and 32. Each of the CCCs may be formed from one or more EPNs, which distribute the calls to the various agents at a particular location. As such, the EPNs associated with an ACD may be hyperlinked to an EPN web page, such as illustrated in FIG. 10 which provides additional information regarding the particular EPN, such as the "port/card" assignment within the selected EPN cabinet. Such information is relatively useful to a service technician who can look up the information on the Intranet rather than looking through a number of detailed corporate records.

A load balance page is illustrated in FIG. 11. This home page may be provided to display the traffic for an entire ACD. For example, referring to FIG. 2, the ACD 28 illustrates a CCC in Kalamazoo with three EPNs; a CCC in Bethune with one EPN; a CCC in Southfield with seven EPNs; and a CCC in Saginaw with four EPNs. Referring back to FIG. 11, the traffic load for each of the EPNs may be illustrated visually. For example, the load balance page may be provided with a plurality of columns 180-188. The columns 180-186 may be used to indicate the port network number, the EPN or host cabinet, name, the occupancy rate and the highest occupancy rate ever of all of the EPNs as well as the host cabinets. The occupancy information may be shown graphically by way of a bar graph in column 188. For example, a left-hand portion 190 of the bar chart may be used to represent the current occupancy for the previous hour while the right portion 192 may be used to represent the highest occupancy ever.

SOFTWARE

Figure 12:
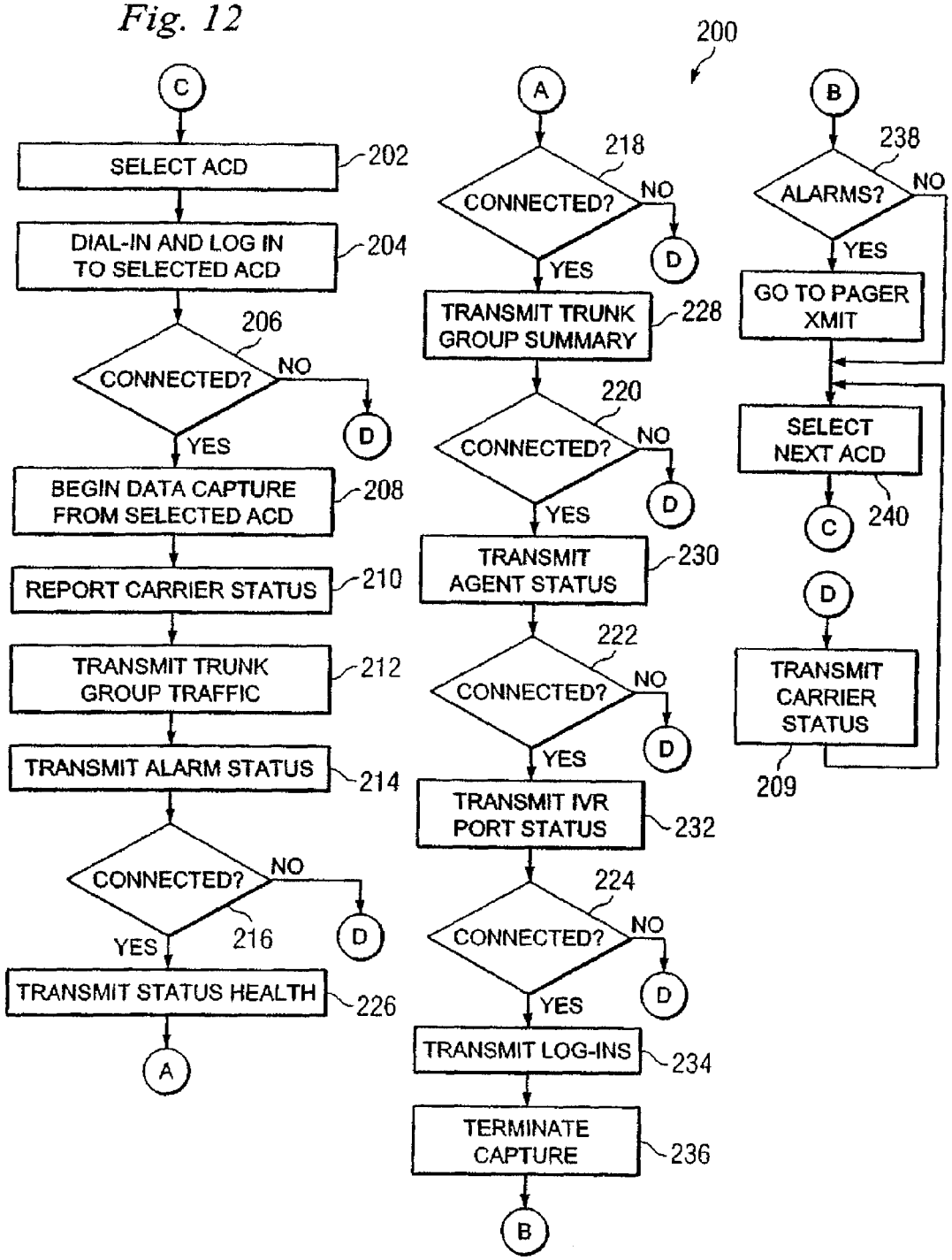
FIG. 12 includes flow diagrams depicting exemplary methods for capturing data from various ACDs.
Figure 14B:
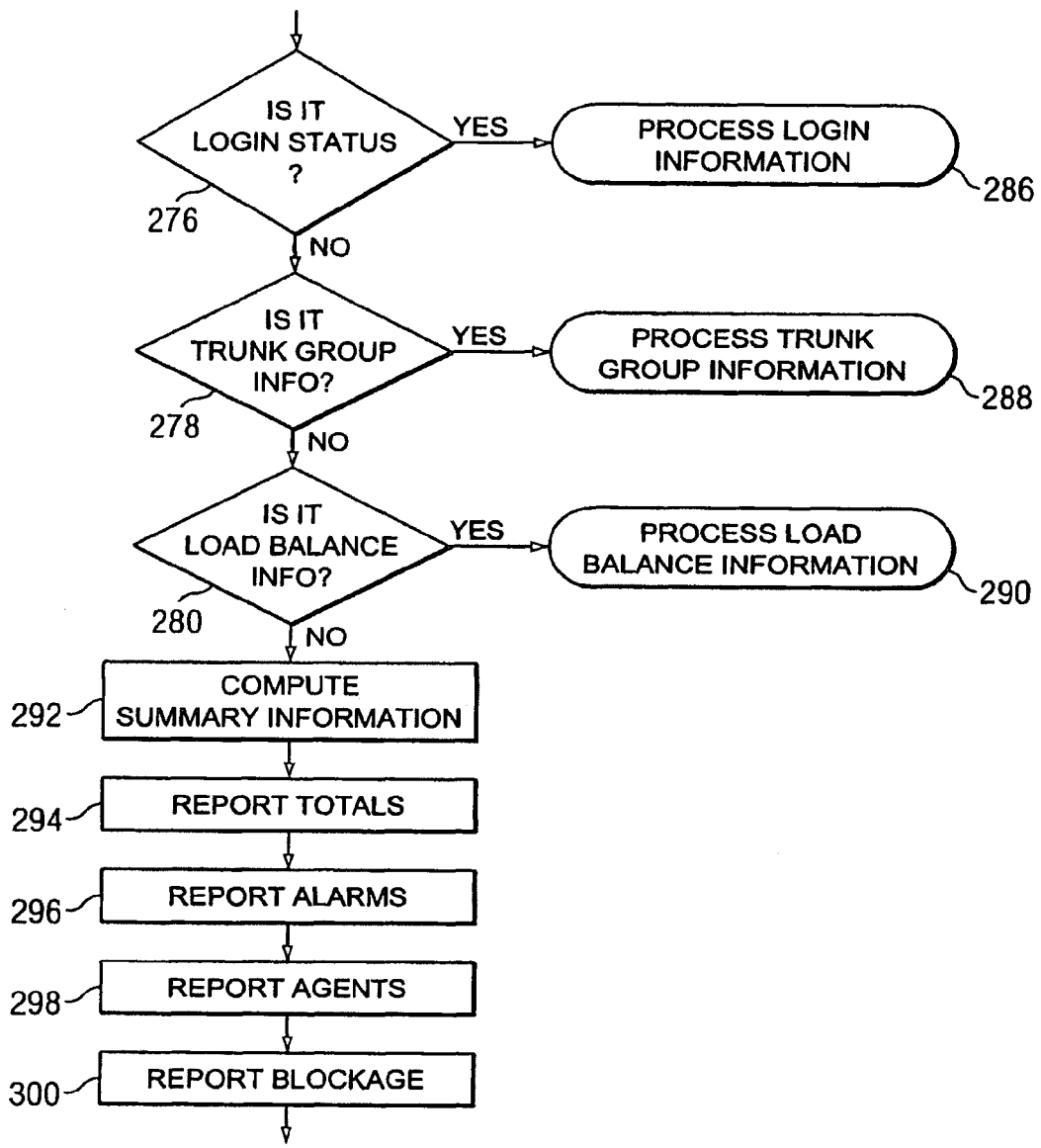
Figure 14C:
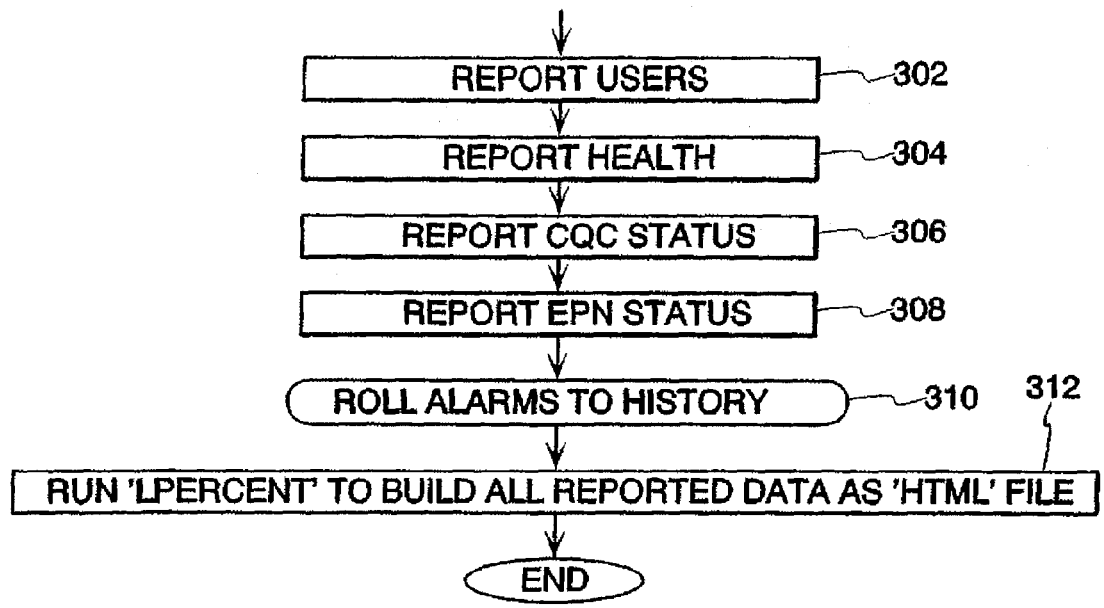

As mentioned above, the present invention continuously and automatically polls the ACDs over a dial up connection, captures data stored relative to the ACDs and processes this data, for example, to generate the exemplary web pages illustrated in FIGS. 4 through 11. The system in accordance with the present invention may be implemented with standard communications type software, such as Procomm Plus V4.7, available from Symantec Corp., and adapted to provide continuous and automatic polling and transmission of data stored in the ACDs. In one embodiment of the invention, the system is adapted to transmit data, such as alarm data, gathered from the ACDs, to a paging platform to provide notification of the alarm status of the ACDs in addition to or in lieu of the web pages illustrated in FIGS. 4 through 11. The communication software is illustrated in FIG. 12 while the paging software is illustrated in FIG. 13. In particular, as will be discussed in more detail below, FIG. 12 illustrates a modification to a standard communication software package, such as a Procomm Plus V4.7 package, for continuously and automatically dialing up and logging in as well as retrieving data from the various ACDs in the network. The paging software illustrated in FIG. 13 may be used to send out a display page based upon the occurrence of major and/or minor alarm conditions of the ACDs. The flow diagrams illustrated in FIG. 14 through 20 relate to processing of the data from the various ACDs in order to generate the various web pages illustrated in FIGS. 4 through 11. Exemplary software written in C+ for automatically and continuously dialing up, logging and capturing data from the ACDs is provided in Appendix 6. Exemplary software written in C+ for transmitting alarm status to a pager platform is provided in Appendix 7. Although the C+ software illustrated in appendices 7 and 8 is written around the Procomm communications software, the principles of the present invention are applicable to virtually any standard communication software package.

Appendices 1 through 5 relate to the C+ files for processing the data retrieved from the various ACDs. In particular, Appendix 1, entitled "mic1.cfg" is a configuration file for the ACD 28, "Michigan-1". This file, "mic1.cfg", identifies all of the equipment connected to the ACD 28, "Michigan-1". For example, with reference to Appendix 1, the file identifies the various inbound trunks from the long distance carriers 38 and 40 (FIG. 1), DID trunks, the intermachine trunks (IMT); the outbound trunks, the interactive voice response unit (IVR) trunks, the contact quality center (CQC) and the various EPNs connected to the ACD 28.

Appendix 2, entitled "mic1.eqp", is an equipment file of all the various equipment connected to the ACD 28; (FIG. 1) "Michigan-1". As shown in Appendix 2, all of the equipment being monitored for the ACD 28 (FIG. 1), Michigan-1 is identified in Appendix 2.

Appendix 3 relates to a trunk file for the ACD 28 (FIG. 1), "Michigan-1". For example, page 3 of Appendix 3 identifies Troy trunk group number 629. As shown on page 3 of Appendix 3, Troy trunk group 629 is shown to consist of circuits 004 E 17; 005 E 17; 006 A 17; 007 A 17 and 007 E 17, which corresponds to box 156 in FIG. 5A.

Appendix 4, entitled "mic1.gat", relates to the agent's skill level for the ACD 28 (FIG. 1), "Michigan-1". This file is used to provide the agent status web page as illustrated in FIG. 9.

Appendix 5, entitled "mic1.pn" is a load balance file. This file is used to provide the load balance web page as illustrated in FIG. 11. For example, as shown, this file is used to provide a load balance or occupancy level of the various port cabinets as well as the EPNs attached to the ACD 28; namely Bethune, Kalamazoo, Saginaw and Southfield.

Referring to FIG. 12 an exemplary flow diagrams for continuously, connecting to, logging into and capturing data from various ACDs is illustrated and generally identified with the reference numeral 200. Initially, an ACD is selected in step 202. The system then dials into and logs onto the selected ACD in step 204. After the system logs onto the selected ACD, the system waits for an answer back to determine if the connection was successful in step 206. If not, the system proceeds to step 209 and transmits and generates a carrier failure status indication in step 209. After a successful connection, the system begins capturing available data from the selected ACD in step 208 and successfully reports the carrier status in step 210. After the carrier status has been reported, trunk group traffic information is received from the selected ACD in step 212. Subsequently, the alarm status is transmitted in step 214.

In order to provide some level of reliability of the data transmitted from the ACD, the system may periodically check the carrier connection as illustrated in steps 216, 218, 220, 222 and 224. Anytime a carrier failure is detected, the system proceeds to step 208 and generates a carrier failure indication.

Assuming that the system is connected, the status health of the selected ACD is transmitted in 226, after the system checks to see if it is still connected to the carrier in step 218. The system retrieves the trunk group load traffic data in step 228. After again checking the connection of the carrier in step 220, the system retrieves the agent status data in step 230.

In step 232, the system retrieves the IVR port status after checking the connection of the carrier in step 222. Subsequently, in step 234 the system retrieves all login data and terminates the data capture from the ACD in step 236.

If any alarms have been detected, the system may be configured to transmit the alarm information to a paging platform, for example, as illustrated in FIG. 13 in step 238. Subsequently, in step 240 the system selects the next ACD and loops back to step 202 to provide a continuous and automatic process for dialing up; logging into and capturing data from the next of the various ACDs in the network.

As indicated above, the system may be provided with the ability to provide major and minor alarm status to a paging platform. The software for transmitting the major and minor alarm information to a paging platform, for example, Procomm Plus, as illustrated in FIG. 13. This system generally identified with the reference numeral 250 continuously loops waiting for major and minor alarms to be detected as mentioned above in step 238. Once the alarm information is detected in step 252, the alarm data may be assembled in a batch file or other file suitable for transmission to a paging platform. Once the alarm data is assembled in a suitable file, it is continuously transmitted to the paging platform in steps 256 and 258 until the paging platform indicates to the system 250 that the page was successfully received.

Figure 15:
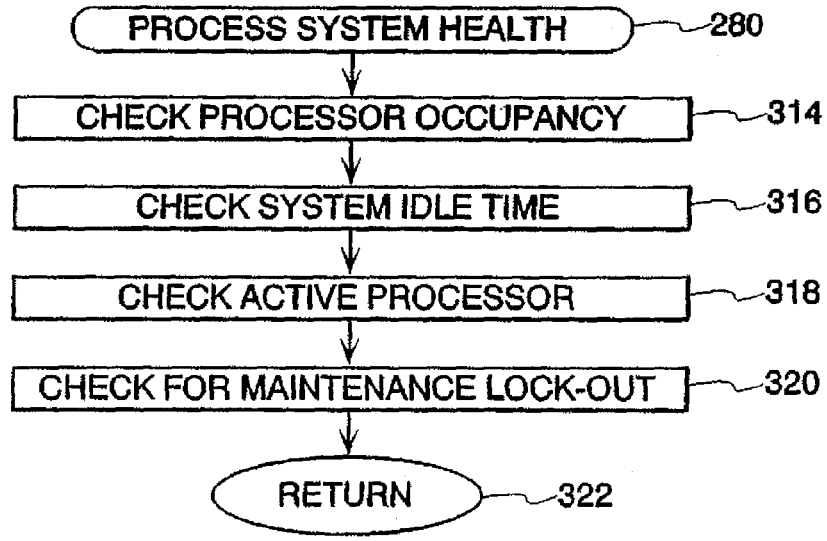

The software for processing the data captured from the ACDs is illustrated in FIGS. 14-20. FIGS. 14A-C illustrates the main loop. Referring to FIGS. 14A-C, the system begins by initializing its arrays and opening files in steps 260 and 262. As known in the art, in order to determine the time corresponding to particular status information provided in an ACD, all ACDs are known to be provided with a real time clock. Depending on the location of the ACD, different ACDs in a network may be in different time zones. As such, in steps 264 and 266, the real time data from the ACDs is obtained and adjusted for the particular time zone for the ACD in processing. Subsequently, in step 268 the data obtained from the ACD, as discussed above in FIG. 12, is read in step 268. In steps 270-280, the system ascertains what type of data was captured. For example, in step 270 the system determines if system health status data was captured. If the data with system health status, the system proceeds to step 280 and processes the system held data as illustrated in FIG. 15.

If the data is not system health status, the system next determines in 272 whether the data is related to alarm information. If so, the system proceeds to step 282 and processes the alarm information in accordance with FIG. 16. If the data is not alarm information, the system next determines whether the captured data was hunt group or agent status information. If the captured data was hunt group information as determined in step 274, the system next proceeds to step 284 and processes the hunt groups information as set forth in FIG. 17. If the captured data was not hunt group information, the system next ascertains whether the data is login status in step 276. If so, the system proceeds to process the login information in step 286 as illustrated in FIG. 18. If the data is not login status information, the system checks in step 278 to determine whether the data is trunk information. If so, the system processes the trunk group information in step 288 as set forth in FIG. 19. If the captured data is not system health status data; alarm information; hunt group information; login status or trunk group information, the system next ascertains whether the data capture was load balance information. If so, the system proceeds to step 290 and processes the load balance information as set forth in FIG. 20.

All of the data processing algorithms illustrated in FIGS. 15-20 return to the main loop. Subsequently, after all of the various data is processed as set forth in FIGS. 15 and 20. The system computes the summary information in steps 292 (FIG. 14B) and may load it into HTML files for displaying by way of the web pages illustrated in FIGS. 4-11. In particular, system summary information may be used for example to provide data for the ACD web page, for example, as illustrated in the data boxes 132, 134 illustrated in FIG. 4. In step 294, the total number of trunk groups is listed in column 140 in the data box 132. Next, in step 296, the total for the alarm status may be provided for the data box 134 (FIG. 4). Lastly, the summary information computed in step 292 to report the number of agents in step 298 and the blockage in step 300 from the information obtained in step 290 for display in the data box 136 in FIG. 4. In step 302, the system identifies the various login users to the ACD in the data box 136 in FIG. 4. For example, as shown in FIG. 4, the user "barnh" is identified. Next, in step 304 the system processes the system health.

In particular, the system checks the occupancy and idle time for reporting in the data box 136 in the ACD home page illustrated in FIG. 4. In step 306, the system reports the contact quality status (CQC) in the data box 132 on the ACD home page 130 illustrated in FIG. 4. The CQC is treated like a trunk group and is reported as either "used" or "idle". Next, in step 308, the system reports the EPNs status. As mentioned above, the ACD web page includes an EPN hyperlink, linked to the various EPNs connected to the specific ACD, for example as illustrated in FIGS. 7A and 7B. As discussed above, this data may be used to provide occupancy (i.e. usage) information for the various EPNs for example as illustrated in column 188 in FIG. 11.

Figure 20:
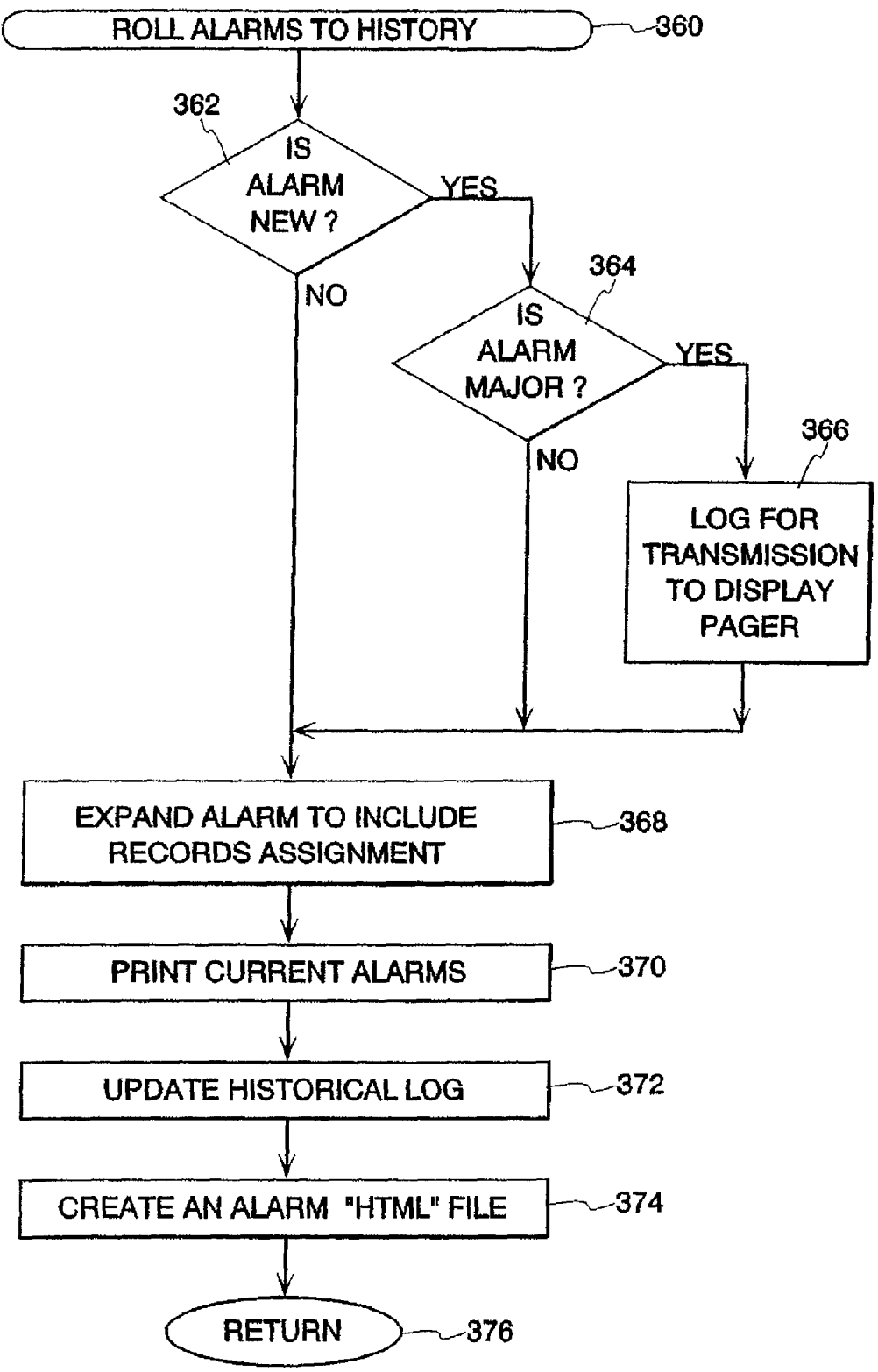

As mentioned above, the system is adapted to provide an alarm log for each ACE. An exemplary alarm log is illustrated in FIG. 8. The information for the exemplary alarm log is generated by the system which forms a historical file for all alarms captured in step 310 as illustrated in FIG. 20. In step 312, the data collected above is used to create a dynamic HTML file to provide virtually real time data by way of a web page.

The software for processing the data captured from the ACD is illustrated in FIGS. 15-20. Referring to FIG. 15, the algorithm for processing the system health is illustrated. In step 314, 316 and 318, system checks data captured from the ACD relating to the occupancy of the ACD; idle time and whether the ACD is active. In addition, in step 320 the system checks to determine if the ACD has been blocked out for maintenance activity. The system returns in step 322 to the main loop to process additional data retrieved from the selected ACD.

Figure 16:
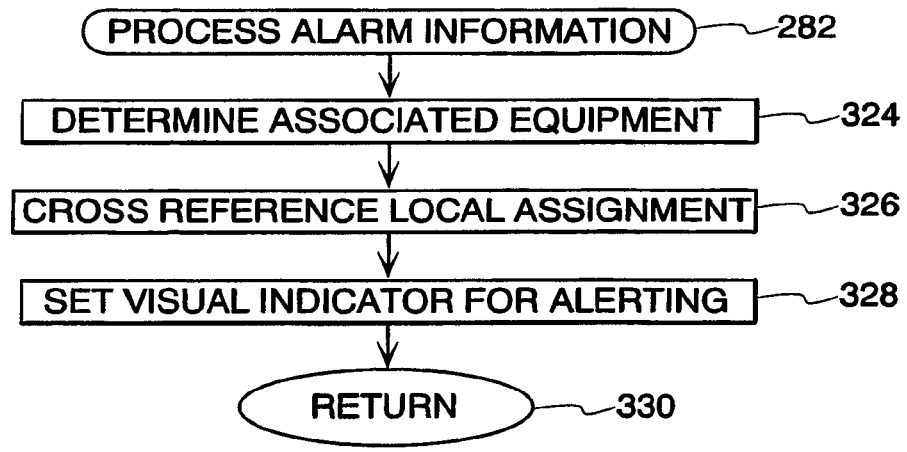

Alarm information is processed as illustrated in FIG. 16. In step 324, the equipment associated with each alarm is determined. This equipment is then cross referenced in step 326 to process the data retrieved with the specific equipment associated with the alarm (i.e., EPN Saginaw), for example as illustrated in FIG. 8. Next, in step 328 the system identifies the alarms in the data box 134 (FIG. 4) of the ACD web page 130. The system returns in step 330.

Figure 17:
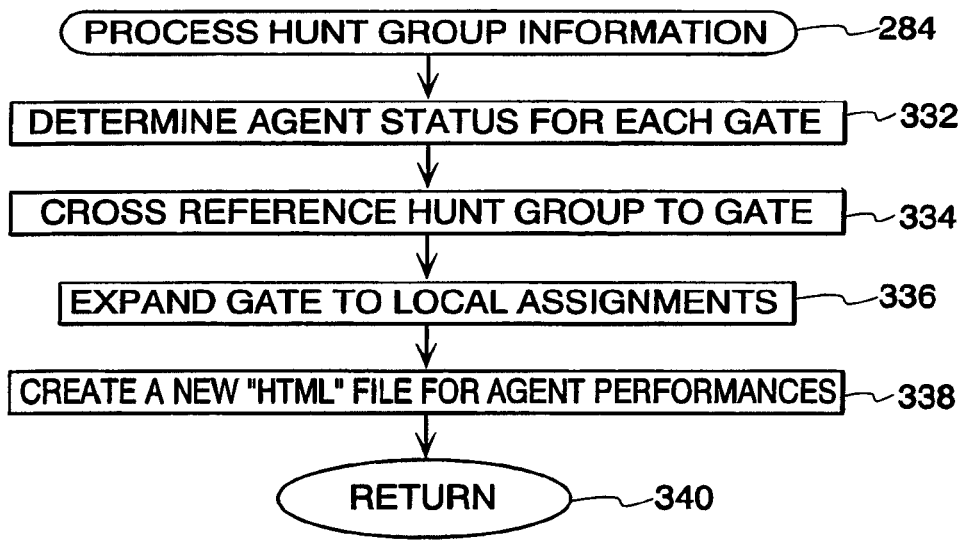
Figure 18:
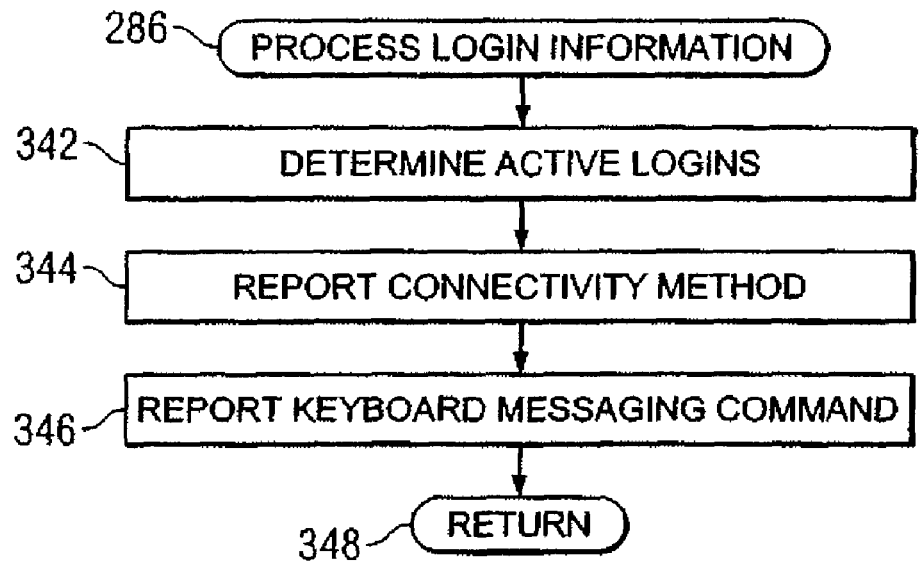

A sub-system for processing hunt group information is illustrated in FIG. 17. The data processed by this sub system is used to create agent status web pages as illustrated in FIG. 9. Initially, in step 332 the system determines the status of each agent (i.e. skill level of agent; number of calls in the queue; longest wait for calls). In step 334, the agents are crossed reference to various gate groups, for example, the gates identified in FIG. 9. In step 326, the gates are grouped according to local assignments, for example as illustrated in FIG. 9. The information may be used to create a dynamic HTML file for display on a web page illustrated in FIG. 9. The system returns from step 340.

Login information may be processed as illustrated in FIG. 18. This information is used to identify the login users and the current system status data box 136 (FIG. 4) on the ACD home page 130. Initially this system determines the number of active logins in step 342. For example, as shown in FIG. 4, the user "rbarnh" is illustrated. In step 344, the connectivity is reported. As shown in the data box 136 in FIG. 4, the connectivity method is shown as dial up versus direct connect (i.e. local log-in). In step 346, keyboarding messaging commands are reported. The most recent input messages by the user provide a historical audit trail of activity. The system returns in step 348.

Figure 19:
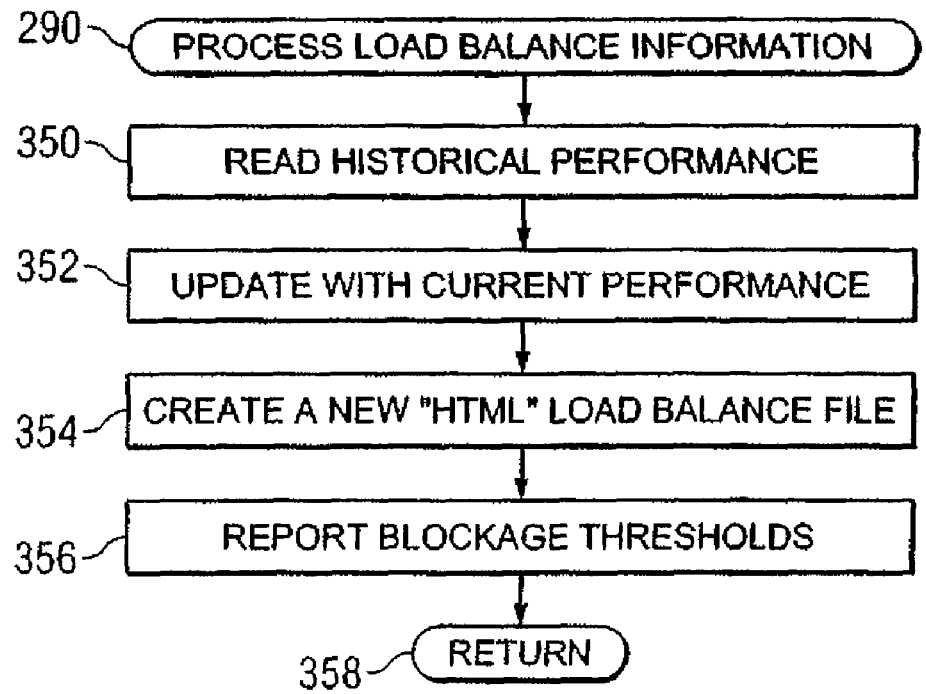

The system for processing load balance information is illustrated in FIG. 19. This information is used to provide the load balance information illustrated in column 192 of the traffic load web page illustrated in FIG. 2. Initially, in step 350 historical load balance data is read. This data is updated with the current load balance information in step 352 and used to generate a HTML load balance file. In step 354, is used to generate the web pages illustrated in FIGS. 4 and 11. In step 356, blockage thresholds are reported. The blockage thresholds relate to 0%-100% for growth potential of capacity exhaust). This data is used for the data box 136 of the ACD web page 130 illustrated in FIG. 4. The system returns in step 358.

As mentioned above, the system may be used to generate an alarm log, for example as illustrated in FIG. 8. Initially in step 362, the system determines whether the alarm is new. If so, it determines whether the alarm is a major alarm in step 364. If the system is a major alarm, the system logs the alarm for transmission to a display pager in step 366. If the alarm is not a major alarm or if the alarm is not a new alarm, the system proceeds to step 368 for display on the web page illustrated in FIG. 8. The system may also include a step 370 for printing current alarms. Subsequently, in step 372, the historical alarm log is updated. This information is used in step 374 to create a dynamic HTML file for display, for example in FIG. 8. The system returns in step 376.

Exemplary HTML code for the web pages illustrated in FIGS. 4-11 is provided in appendices 9-16 as indicated in the table below.

| Figure | HTML File Name | Appendix |
|--------|----------------|----------|
| 4      | mic1.htm       | 9        |
| 5      | mic1011.htm    | 10       |
| 6      | 324230.htm     | 11       |
| 7      | mic1epn.htm    | 12       |
| 8      | mic1alm.htm    | 13       |
| 9      | mic1agnt.htm   | 14       |
| 10     | mic1E14.htm    | 15       |
| 11     | mic1load.htm   | 16       |

It should be appreciated that a wide range of changes and modifications may be made to the embodiment of the invention as described herein. Thus, it is intended that the foregoing detailed descriptions be regarded as illustrative rather than limiting and that the following claims, including all equivalents, are intended to define the scope of the invention.

What is claimed is:

1. A method for providing information regarding the status of an automatic call distributor (ACD), the method comprising:
    retrieving, by a server, trunk loading data from an ACD; and
    responsive to a request from a web browser, providing a web page indicative of at least a portion of the retrieved data to the web browser;
    wherein the trunk loading data includes traffic load information pertaining to a trunk group selected from the group of trunk groups consisting of an inbound trunk group and an outbound trunk group.

2. The method of claim 1, wherein the traffic load information includes percent occupancy information pertaining to the trunk group.

3. The method of claim 2, wherein providing said web page includes providing a web page including a graphical portion and a text portion.

4. The method of claim 3, wherein the percent occupancy information is presented in the graphical portion.

5. A method for providing information regarding the status of an automatic call distributor (ACD), the method comprising:

retrieving, by a call management system, trunk loading data from an ACD; and responsive to a request from a web browser, providing a web page indicative of at least a portion of the retrieved data to the web browser;

wherein providing said web page includes providing a web page including a hyperlink and wherein, responsive to a user selecting the hyperlink, said method further includes providing additional ACD status information to the user.

6. A method for providing information regarding the status of an automatic call distributor (ACD), the method comprising:

retrieving, by a server, trunk loading data from an ACD; and responsive to a request from a web browser, providing a web page indicative of at least a portion of the retrieved data to the web browser;

wherein trunk loading data includes alarm condition data for alarms associated with the ACD, and wherein the web page is indicative of said alarm conditions and wherein, responsive to determining from the web page that a predetermined alarm condition is asserted, paging an administrator.

7. A method for providing information regarding the status of an automatic call distributor (ACD), the method comprising:

retrieving, by a call management system, trunk loading data from an ACD including traffic load data pertaining to trunk groups associated with the ACD and alarm data indicative of alarms associated with the ACD;

responsive to a request from a web browser, providing a web page indicative of at least a portion of the retrieved data to the web browser.

* * * * *